US008255817B2

(12) United States Patent  (10) Patent No.: US 8,255,817 B2
Faught  (45) Date of Patent: Aug. 28, 2012

(54) 3-D DISPLAY FOR TIME-BASED INFORMATION

(75) Inventor: Robert T. Faught, Jamaica Plain, MA (US)

(73) Assignee: Quotidian, Inc., Jamaica Plain, MA (US)

( * ) Notice: Subject to any disclaimer, the term of this patent is extended or adjusted under 35 U.S.C. 154(b) by 972 days.

(21) Appl. No.: 12/035,647

(22) Filed: Feb. 22, 2008

(65) Prior Publication Data

US 2008/0235628 A1    Sep. 25, 2008

Related U.S. Application Data

(60) Provisional application No. 60/891,825, filed on Feb. 27, 2007.

(51) Int. Cl.
*G06F 3/00*    (2006.01)
(52) U.S. Cl. .................. 715/767; 715/766; 715/848
(58) Field of Classification Search ........... 715/848–852
See application file for complete search history.

(56) References Cited

U.S. PATENT DOCUMENTS

| | | | | |
|---|---|---|---|---|
| 5,729,704 | A * | 3/1998 | Stone et al. | 715/804 |
| 5,790,853 | A | 8/1998 | Nomura et al. | |
| 5,815,158 | A | 9/1998 | Lubachevsky et al. | |
| 6,054,989 | A * | 4/2000 | Robertson et al. | 715/848 |
| 6,144,375 | A | 11/2000 | Jain et al. | |
| 6,160,553 | A * | 12/2000 | Robertson et al. | 715/767 |
| 6,166,738 | A * | 12/2000 | Robertson et al. | 715/839 |
| 6,243,093 | B1 * | 6/2001 | Czerwinski et al. | 715/848 |
| 6,253,218 | B1 | 6/2001 | Aoki et al. | |
| 6,308,187 | B1 * | 10/2001 | DeStefano | 715/234 |
| 6,523,048 | B2 * | 2/2003 | DeStefano | 715/234 |
| 6,546,188 | B1 | 4/2003 | Ishii et al. | |
| 6,819,344 | B2 * | 11/2004 | Robbins | 715/848 |

(Continued)

FOREIGN PATENT DOCUMENTS

JP    2004160041 A    6/2004
JP    2006301713 A    11/2006

OTHER PUBLICATIONS

International Search Report and Written Opinion, International Patent Application No. PCT/US08/54691, mailed Jul. 30, 2008 (8 pages).

(Continued)

*Primary Examiner* — Mark Rinehart
*Assistant Examiner* — William Titcomb
(74) *Attorney, Agent, or Firm* — Wilmer Cutler Pickering Hale and Dorr LLP

(57) ABSTRACT

A computer-implemented method of displaying information about first and second pluralities of time-based events, the method involving: displaying perspective representations of each of a plurality of timelines including a first timeline and a second timeline, wherein the perspective representation of the first timeline is made up of perspective images of representations of the events of the first plurality of events arrayed along the first timeline at locations in time corresponding to those events and the perspective representation of the second timeline is made up of perspective images of representations of the events of the second plurality of events arrayed along the second timeline at locations in time corresponding to those events; enabling a user to select a current time; and in response to the user selecting the current time, displaying perspective representations of a portion of each of the first and second timelines as determined by the user selected current time.

37 Claims, 19 Drawing Sheets

U.S. PATENT DOCUMENTS

| | | | |
|---|---|---|---|
| 7,155,676 B2* | 12/2006 | Land et al. | 715/731 |
| 7,418,674 B2* | 8/2008 | Robbins | 715/848 |
| 7,428,710 B2* | 9/2008 | Robbins | 715/848 |
| 7,663,620 B2* | 2/2010 | Robertson et al. | 345/419 |
| 2005/0289482 A1* | 12/2005 | Anthony et al. | 715/851 |
| 2008/0307351 A1* | 12/2008 | Louch et al. | 715/782 |

OTHER PUBLICATIONS

"Asahi Personal Computer No. 321." Asahi Newspaper. Nov. 1, 2002. (5 pages).

European Search Report for European Patent Application No. 08730484.6 mailed May 11, 2012. 6 pages.

* cited by examiner

3-D DISPLAY FOR TIME-BASED INFORMATION

CROSS REFERENCE TO RELATED APPLICATIONS

This application claims the benefit of U.S. Provisional Application No. 60/891,825, filed Feb. 27, 2007, all of which is incorporated herein by reference.

TECHNICAL FIELD

This invention relates to the display of time-base information and programs for displaying such information.

BACKGROUND OF THE INVENTION

Time is an important aspect of so many kinds of information. It is useful to be able to display time-based information on a timeline to visually present the time aspect of the information. Current web technology and computer visualization methods deal with time-based data with various domain specific or ad hoc methods. For example, there are calendar programs that can be used to organize appointments and tasks in the calendar according to the dates assigned to those events. And there are programs that are capable of displaying data (e.g. economic or financial data) along timelines to highlight trends and changes in the data. There is, however, a need for a unified and visually effective way of representing temporal relationships for multiple different contexts and to fit time related data from multiple different sources into a consistent viewing framework.

SUMMARY OF THE INVENTION

In general, in one aspect, the invention features a computer-implemented method of displaying information about a first plurality of time-based events, each of which has an associated time, and a second plurality of time-based events, each of which has an associated time. The method involves: displaying perspective representations of each of a plurality of timelines including a first timeline and a second timeline, wherein the perspective representation of the first timeline is made up of perspective images of representations of the events of the first plurality of events arrayed along the first timeline at locations in time corresponding to the times associated with those events and wherein the perspective representation of the second timeline is made up of perspective images of representations of the events of the second plurality of events arrayed along the second timeline at locations in time corresponding to the times associated with those events; enabling a user to select a current time; and in response to the user selecting the current time, displaying perspective representations of a portion of each of the first and second timelines as determined by the user selected current time.

Other embodiments of the invention include one or more of the following features. Displaying perspective representations of a portion of each of the first and second timelines involves identifying an event among the first plurality of events that corresponds to the current time and displaying an image of the representation of that corresponding event as a front event on the first timeline. Displaying perspective representations of a portion of each of the first and second timelines also involves identifying a corresponding event among the second plurality of events and displaying an image of the representation of that corresponding event among the second plurality of events as a front event on the second timeline. Each event of the first plurality of events has an associated time range and the identified corresponding event is identified by finding an event among the plurality of first events for which the associated time range includes the current time. Alternatively, displaying perspective representations of the portion of each of the first and second timelines involves identifying all events among the first plurality of events for which their respective time ranges include the current time and displaying images of the representations of said all events as front events on the first timeline. Displaying the representation of the corresponding event as a front event on the first timeline also involves not displaying representations of any of the events in the first timeline that are after the front event.

Other embodiments of the invention may also include one or more of the following features. The representations of the events are three dimensional objects each of which has a time dimension and two spatial dimensions. The images of the representations of the events are projections of the three dimensional objects representing the events. Displaying a perspective representation of each of a plurality of timelines involves displaying the second timeline within the first timeline or alternatively, displaying the first and second timelines next to each other. The method further involves assigning each timeline of the plurality of timelines with an associated different region of an x-y space and using the associated regions to determine where the perspective representations of the timelines are displayed on a visual display device. The associated region for the second timeline is within the associated region for the first timeline. The method also involves one or more of the following features: (1) enabling the user to select a location within the x-y space to thereby determine which of the plurality of timelines is displayed to the user; (2) enabling the user to select a scale for the x-y space and thereby determine what timelines located around said location in x-y space are displayed; (3) assigning a corresponding level to each of the events among the first plurality of events and using the levels that are assigned to the events among the first plurality of events to determine which events among the first plurality of events are displayed and which events among the first plurality of events are not displayed along the perspective representation of the first timeline; (4) storing time-based information for each event of the first plurality of events; (5) associating other information with each of the events of the first plurality of events and wherein displaying the image of the representation of the front event of the first plurality of events also involves displaying at least some of the other informant associated with that front event; (6) associating other information with each of the events of the first plurality of events and displaying at least some of the other information along with the perspective images of the representations of at least some of the events among the first plurality of events. For each event of the first plurality of events, the other information includes a label and/or text and/or an image associated with that event and displaying at least some of the other information along with the perspective images of the representations of at least some of the events among the first plurality of events involves displaying the labels/text/images.

In general, in another aspect, the invention features computer readable medium storing code for causing a computer to display information about a first plurality of time-based events, each of which has an associated time, and a second plurality of time-based events, each of which has an associated time. The stored code when executed on the computer causes the computer to: display perspective representations of each of a plurality of timelines including a first timeline and a second timeline, wherein the perspective representation of the first timeline is made up of perspective images of representations of the events of the first plurality of events arrayed along the first timeline at locations in time corresponding to the times associated with those events and wherein the perspective representation of the second timeline is made up of perspective images of representations of the events of the second plurality of events arrayed along the second timeline at locations in time corresponding to the times associated with those events; enable a user to select a current time; and in response to the user selecting the current time, display perspective representations of a portion of each of the first and second timelines as determined by the user selected current time.

Other embodiments of the invention may include code which implements one or more of the functions and/or features listed above.

The techniques described herein are versatile in that they can be used with web browsers, with other programs that need to show temporal relationships in data, or as a standalone program.

The details of one or more embodiments of the invention are set forth in the accompanying drawings and the description below. Other features, objects, and advantages of the invention will be apparent from the description and drawings, and from the claims.

DESCRIPTION

The described embodiment is a computer program for the presentation of information with a time component. This kind of information includes things like (but not limited to): schedules, historical events, statistical data, sounds, music, movies, and continuous functions like the phases of the moon. The program is an elaboration of a traditional timeline, where events are marked on a line extending from the past to the future. The program allows many timelines to be displayed at the same time and allows for a variety of relationships in the data to be explored.

3-D Computer Graphics

Before starting a description of the program, it is useful to provide some basic definitions of the concepts used in 3-D computer graphics.

The organizing principle of three-dimensional computer graphics is called the "synthetic camera model". This model reproduces what is done by human eyes and cameras to form images of the real world. There are two independent entities: a set of geometric objects (an object model), and a virtual camera. These are combined by graphics hardware or software in a process called projection to produce a two-dimensional image.

Figure 1:
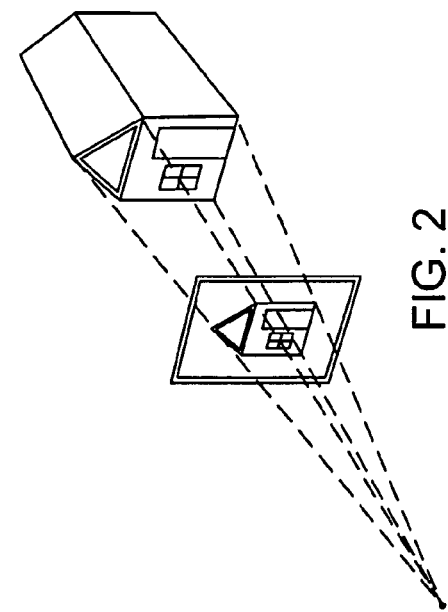
FIG. 1 shows a geometric object.

Referring to FIG. 1, a geometric object reduces to a set of polygons covering the surface of the object. The polygons are defined by a set of vertices located as x, y, and z values in the three-dimensional coordinate system.

Figure 2:
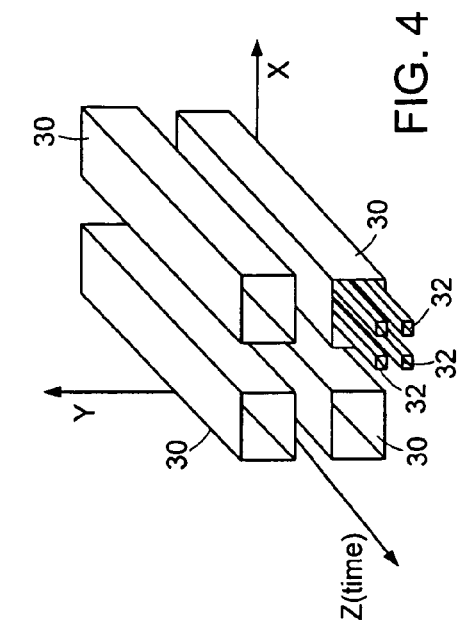
FIG. 2 illustrates a projection process that is used in 3-D computer

The projection process determines the amount of depth distortion or perspective in the final image. In FIG. 2, the camera or viewpoint is at the lower left. In a real camera or eye, the projection plane is past the viewpoint and the image is upside down. We move the plane in front of the viewpoint for clarity, but the principle is unchanged.

Figure 3:
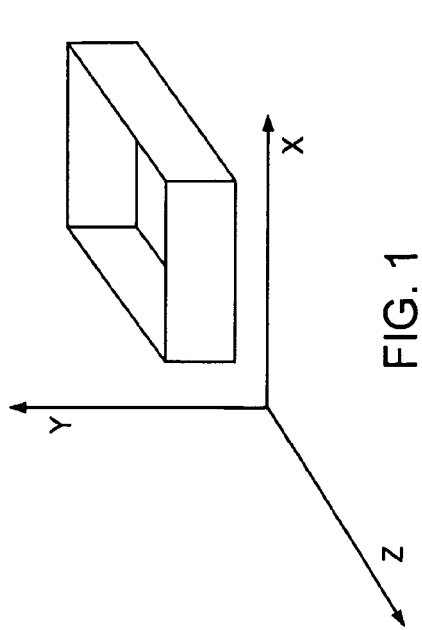
FIG. 3 illustrates the viewing volume of the "camera" in a 3-D model.

The camera has a location in the 3-D space. From that location, the camera points in a certain direction. The camera also has a viewing volume, shown by the gray area in FIG. 3, to define which objects are visible. Objects that are outside the viewing volume are said to be clipped. In addition to the side, top, and bottom clipping planes of a real camera, the computer model also has front and back clipping planes. Objects, or parts of objects, closer to the camera than the front clipping plane are not shown. Objects, or parts of objects, farther from the camera than the back clipping plane are not shown either.

Time in 3-D

The program's object model uses the z axis to represent time. The origin, or zero value, of the z axis is an arbitrarily chosen time (e.g. midnight on Jan. 1, 1970).

Figure 5:
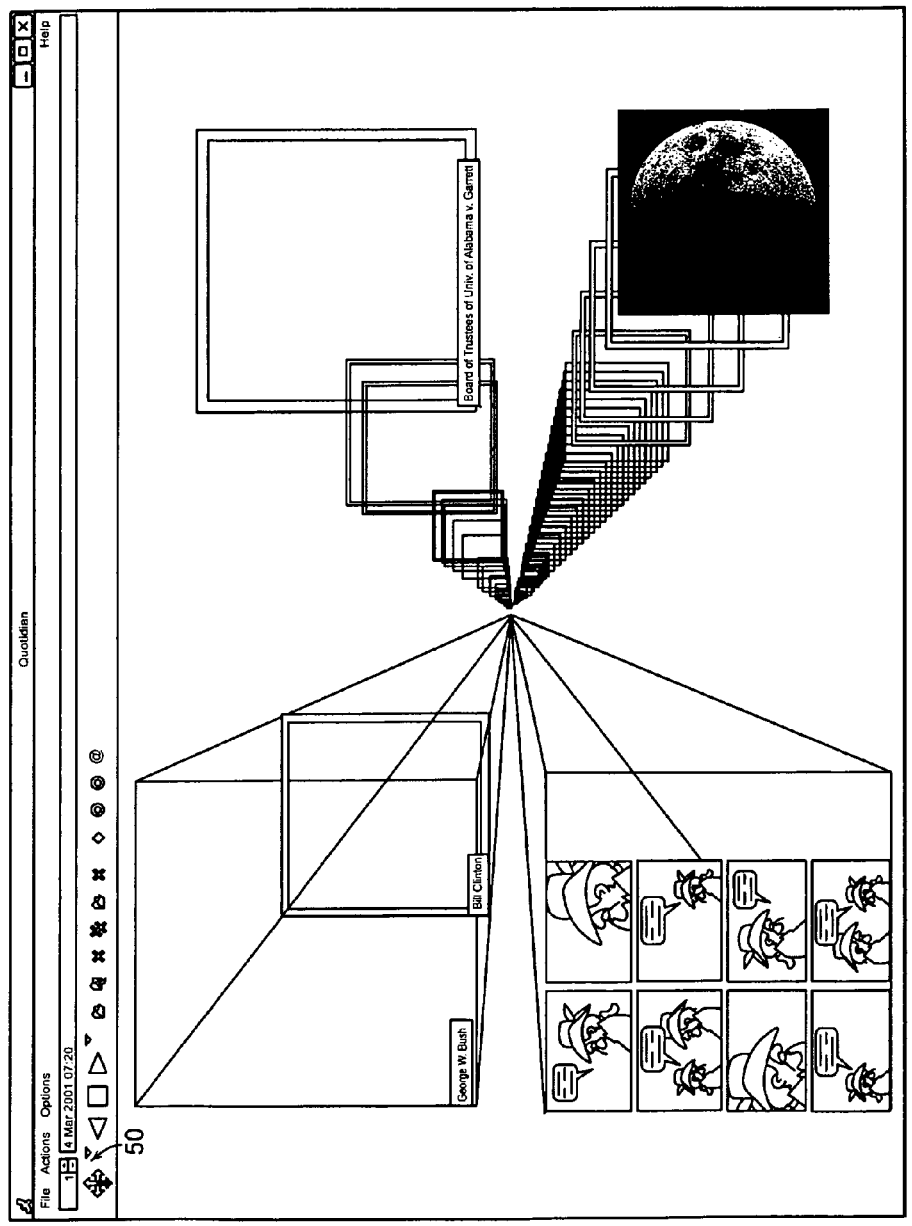
FIG. 5 illustrates a program interface which displays perspective views of four different timelines, each associated with a corresponding different on four neighboring categories.

The program introduces the concept of a "current time". Referring to FIG. 5, this is the time shown in the box in the upper part of the program's display just under the menu line. The program's current time can be changed forward or backward in a number of ways by the user. For example, the user can employ control buttons that are available on the program's display (see toolbar in FIG. 5) or the user can employ external control devices such as a game controller (not shown).

The user has the ability to change the direction of her view into the program's object model. There are four principle directions: facing the past down the z (time) axis, facing the future down the z (time) axis, looking to the left down the x axis, and looking to the right down the x axis. In addition to changing the virtual camera's direction, the user can move the camera up and down any of the three axes.

Figure 6:
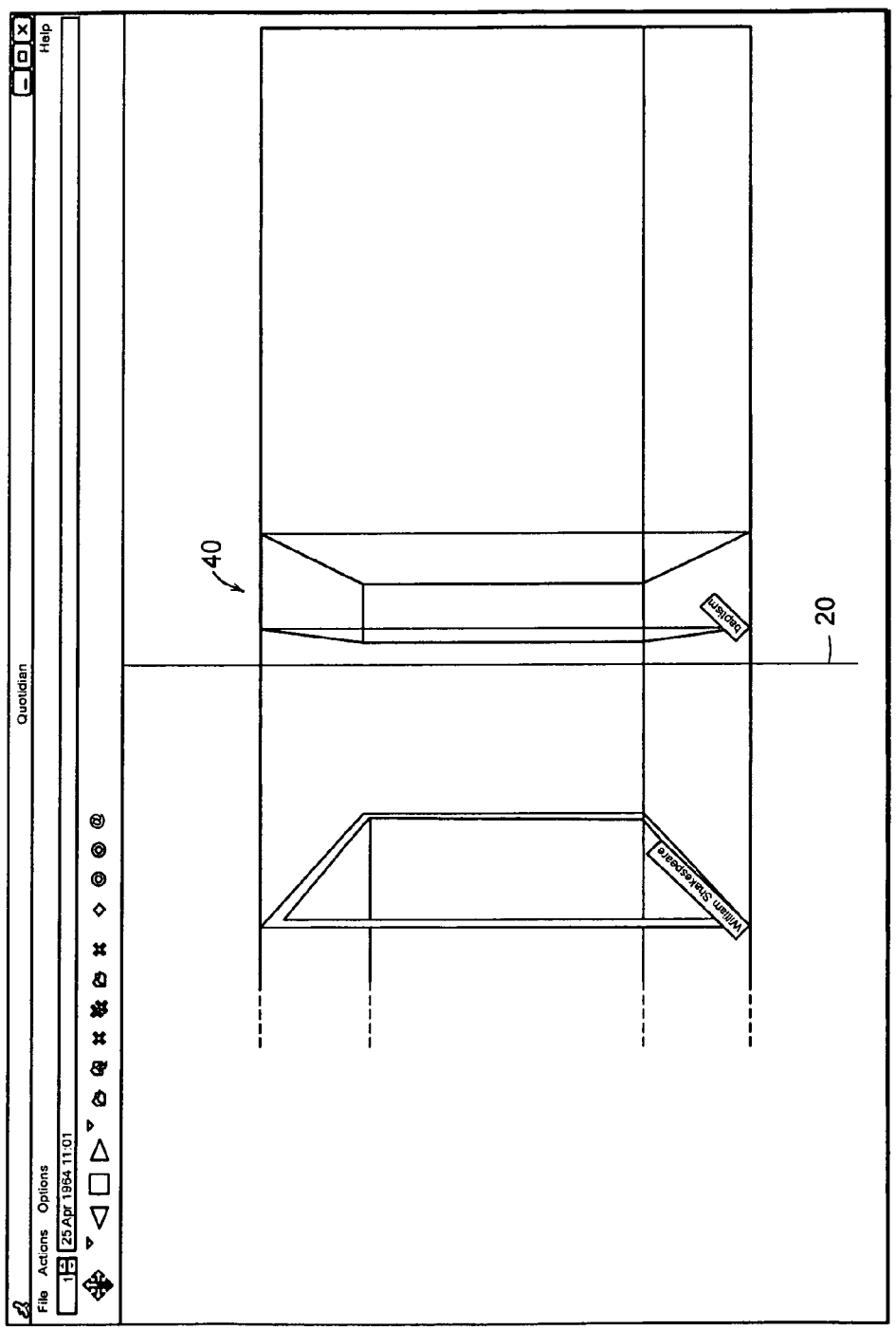
FIG. 6 illustrates an example of how the program displays the three dimensional space from a viewpoint along the x axis and showing time running from left to right.

When the display direction is aligned with the z axis, either facing towards the past or towards the future, the current time is the front clipping plane for the display. When the display is looking down the x axis, as illustrated in FIG. 6, the current time is a (visible or invisible) line 20 running from top to bottom and cutting the displayed image in half. This line is the plane defined by the current time turned sideways.

By scaling the z axis, the user can expand or shrink the space that a time interval takes in the display.

Controls for scaling the different axes and for performing the other functions described herein are available in the toolbar at the top of the program's display.

In this description, we use "current time" to indicate the program's current time setting that is shown in a box on the main program window. We use "clock time" to indicate the time in the world that contains the computer and its user.

The X/Y Plane

Figure 4:
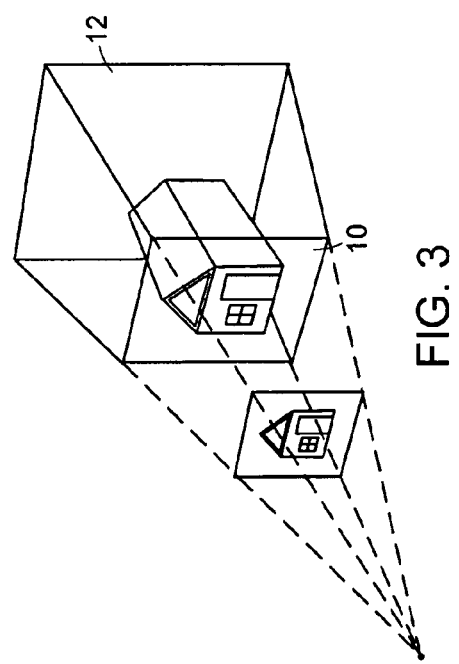
FIG. 4 illustrates the concepts of categories and nested categories defined in the three dimensional space which has two spatial dimensions (x and y) and a time dimension.

Referring to FIG. 4, the x and y axes are used to layout abstract objects we call "categories" 30 and 32. Categories occupy space in the plane formed by the x and y axes. Categories have a given shape in the x and y dimensions, and project to negative and positive infinity in the z axis thus defining a "pipe". Categories can have regular or irregular shapes like circles or maps, but all the images in this document will show square categories. Categories 32 can be nested inside of other categories 30. The nesting of categories usually represents a logical relationship (for example: parent/child, class/sub-class, part-of, member-of.) but it is not required. Categories can be overlapped in the x/y plane to allow for comparison or to collect the contents of multiple categories in a single place.

The x/y plane is bounded at very large values in all directions. The user is free to allocate regions of this plane for her own purposes by defining categories and assigning them location and dimension. For example, there might be a region for historical timelines, another for the schedules of co-workers, and another for music playlists. Other categories of these kinds would nest inside of the user defined ones.

Categories have names and the nesting of categories is defined by a set of category names separated by the backslash ('/') character. This works much like the file pathnames on many computer systems. The first category in the path contains the second, the second the third, and so on.

Categories can be defined with an x/y location, a width and a height, and the program will place the category at that position in the x/y plane. Commonly, they are defined without locations and the program will lay them out either by assigning locations starting at the origin of the x/y axes or by nesting them inside of previously loaded categories in the category's pathname. For example, loading a file that defines the "US Census" category on the "/US History/US Census" category path defines two categories: "US History" containing "US Census". Then loading the "US Senate" category on the "US History/US Senate" path will reuse the "US History" category and nest both "US Census" and "US Senate" inside it.

There is a mode provided by the program to view the layout of categories and to change their relative size and their nesting. FIG. 16 shows this mode looking at the categories from FIG. 15 that intersect a rectangle formed by front clipping plane bounded by the side, top, and bottom clipping planes. Whether the x/y locations were defined in the category or laid out by the program, the user can change the location to suit herself.

When the user's display is facing down the z axis, either towards the past or the future, the computer screen shows a window onto part of the x/y plane. The program provides controls that allow her to change what part of the plane appears in that window. Even when showing a side view, down the X axis, the controls that change the position and scaling in the x/y plane still have the same effects.

Events

Categories are abstract and by themselves are invisible. They serve to organize "events" or "states." Events are occurrences that have a single time value. States have a start time and an end time. The distinction is mostly for convenience since an event might be modeled as a state with the same start and end time, and a state could be modeled as a pair of events, a start event and an end event. We make the distinction to make explicit the logical connection between the two times that define a state. In this description, we will refer to both kinds collectively as "events."

FIG. 5, which illustrates these concepts, shows perspective views of four neighboring timelines, each associated with a different corresponding category. The timeline on the upper left shows the terms of the presidents. The presidents' terms are states. The timeline on the upper right shows the dates of the Supreme Court decisions. The dates of those decisions are events.

Unlike categories, events are directly visible on the computer display. An event can be attached to multiple categories. To be rendered, they are associated with display properties like color, material, and texture. Each event attached to a category takes on the shape and size of that category (in the x and y dimensions) and uses the time associated with the event to establish the size and location of the event's representation in the z dimension.

In this description, when we talk about the a category being visible, or being hidden, we are really referring to the appearance of the set of events attached to that category.

Note in FIG. 5 how the program displays timelines for a series of time-based events. In this case, as already noted above, there are four categories that were defined by the user in the portion of the x-y plane that is being displayed. The shape of the each category in the x-y plane is a square, though other shapes could easily be defined. The user has attached a sequence of events to each category and the program is displaying each sequence of events as a timeline with its boundaries defined by the category to which that sequence of events was attached.

Each time-based event has a time or time period associated with it. The program places the event within the region defined by the category to which it is attached and at a location in time that corresponds to the time for that event. In this example, the program highlights the region of the category that corresponds to the event to thereby make the event visible to the user. The array of displayed events along the region defined by the category to which the events are attached represents a timeline for those events. So, in this instance there are four separate timelines, one for each category.

The program displays a perspective representation of these timelines showing the events arrayed along them. In other words, the program projects the displayed sequence of events for each category to the plane of the two dimensional display surface assuming a camera position that is located, in this example, in x-y space at approximately near the center of the area containing the four categories. The program represents each event in a category by a three dimensional object with the x-y dimensions of that object defined by the outer boundary of the category to which it is attached and the depth of the object defined by the duration of time associated with that event. The program projects that three dimensional objects onto the viewing surface in accordance with the selected viewing position. Thus, as you can see, even though the user is "looking" down the time axis, the time dimension of the events are visible by virtue of this projection process.

At the far end of each category (i.e., the end representing far back in time) the perspective representations of the timelines converge on a single vanishing point. And the size of the image representing any event along the timeline decreases as a function of how far that event is from the viewer in time.

In the example illustrated in FIG. 5, the upper left category represents terms of U.S. presidents; the upper right category represents Supreme Court decisions; the lower left category represents the Doonesbury comic strip that appears daily in the papers; and the lower right category represents phases of the moon. Attached to the category representing the terms of U.S. presidents are the names of all U.S. presidents along with their times in office. For the event that is the term of George W. Bush, the program represents it in perspective by a region that extends back along the "pipe" defined by its category to a time that corresponds to end of the President Clinton's term.

In the case of the decisions of the U.S. Supreme Court, the events are the titles of the decisions and the day on which the decision was issued. So, for that timeline, the images for the individual events have a depth of only one day.

Endcuts

The front clipping plane serves to remove objects or parts of objects that are either too close to the viewpoint or behind the viewer. In this program, when the view direction is down the z (time) axis towards the past or future, the front clipping plane also represents the "current time" of the program's display. Each event that is clipped by the front clipping plane (that has the current time between the event's start and end time), has a convenient two dimensional place (the endcut) in which to show information about the event at the current time. FIG. 5 shows the phase of the moon and the Doonesbury cartoon from the newspaper on Sunday Mar. 4, 2001 at about 7:20 in the morning. Moving the current time forward or backward a day would change the phase of the moon and cause another cartoon to be shown.

The current time defines an x-y plane that intersects all timelines. If current time intersects an event on a displayed timeline (which is a timeline that falls within the viewing region), then the program displays that event as the front event on that timeline. In the example illustrated by FIG. 5, the current time (i.e., Mar. 4, 2001) falls within the term of the George W. Bush; so that event is the front event and the program displays it as such. In the described embodiment, this means that the program will not display any other events that are in front of that event, i.e., any events along that timeline that lie between the viewer and current time and are not intersected by the current time.

It is possible that the current time does not intersect any event on a timeline, in which case the program will display the next event that is further along the timeline away from the viewer, assuming of course that the next event is visible, as defined by the other parameters that were defined for the program (to be described later). Returning again to FIG. 5, the timeline for Supreme Court decisions, which is on the upper right of the display, has no event that is intersected by current time. But the next visible event is decision entitled Board of Trustees of Univ. of Alabama v. Garrett. The program displays it as the "front event."

Aspects of Time

Precision

Time values are represented inside the program with different precisions. This makes is possible to represent both geological time, expressed in millions of years, and short lived physical events down to 1/10000000000000000 of a second while remembering how they were specified. There are special time constants for negative infinity (a time earlier than all others), positive infinity (a time later than all others), and "now" (always approximately equal to the current clock time).

There is also a parallel representation for duration. These are expressions like "1 day, 4 hours".

Implicit Precision

An event with a single time value might be taken to represent an single instant in time. This would mean that the display representation of that instant would either change depending of the scale at which the event was viewed or be infinitesimally small and therefore invisible.

This program uses the precision that the user gave when writing the event data to determine an implicit precision. If the user types "4 Jul. 1776" the precision is one day. If the user types "1776" the precision is one year. If the user types "4 Jul. 1776 10:30 AM" then the precision is one minute, and so on.

When displayed, an event is shown to the extent of its precision. For example, if the implicit precision is one day, the event is shown extending from midnight to midnight across the given day. FIG. 6 shows the display of a timeline for events in Shakespeare's life. In this case, the timeline is viewed from down the x-axis with time running from left to right. In FIG. 6, Shakespeare's baptism 40 was given with one day precision (26 Apr. 1564) and so it occupies an entire 24 hour period rather than the length of the ceremony, or the moment the water splashed on him.

Accuracy

Accuracy has to do with the truthfulness of the data. Sometimes the exact time values are not known, or are only known within a range of certainty. For example, Shakespeare's birthday is usually given as 23 Apr. 1564, he was baptized on 26 April, but may have been born as early as 20 April as children were usually baptized within five days of their birth. FIG. 6 shows how the program displays accuracy by showing a gradual transparency at the beginning of the "Shakespeare" event to represent the uncertainty.

A similar kind of effect is used to render states that continue into the future. It is not very useful to have people or building that exist today still being shown when the current time is moved two billion years into the future. To fix this, a probable or arbitrary lifetime can be assigned and the state is rendered with gradual transparency from "now" until the end of that lifetime. It is up to the author entering the event information to decide what a reasonable lifetime for the kind of state might be. For people, there is the special time value "alive" that can be used as a state's end time. Its default duration is one hundred years. After that duration, the state will continue to end at "now" until an author edits the data to set the known end time.

Real Time

The program provides controls which enable the user to select a "real-time mode" where the current time moves forward as if it were a clock. This allows the program to be used as a calendar, a diary, an alarm clock, to play a list of songs, to chart changing data as it occurs, or to show a movie in a category's endcut.

Real time does not refer to the actual clock time but to the automatic updating of the program's current time. One can start it at any current time, for example to play a film or sound connected to an historical event.

Relative Timelines

It is possible to define timelines where all the events are defined relative to some starting point. Instead of the events having absolute start times like "4 Jul. 1776" they can have start times like "one week." All the times in a relative timeline are relative to a single starting time. Normally, this is given by the user when she loads the timeline and all the relative times are then converted to absolute times. Relative timelines are useful for things like a list of songs or a trace of events in a computer program where establishing the relationship between the events within the timeline is more useful than attaching them to the absolute time or times where they might occur.

Event Decorations

In addition to time values, other information can be associated with events. The following information is used by the program. Because of the way that event data is stored, the amount or kind of additional information attached to an event is almost unlimited. The kinds of information that the program does not know how to use are ignored.

Labels

A label is a short piece of text that is displayed near an event when the event is visible on the screen. Labels may be hidden to avoid visual clutter or truncated if too verbose. Labels are not usually rendered in perspective, so they face the viewpoint of the display. Examples of labels are shown in FIG. 6. On the timeline on the upper left, the label identifies the name of the president corresponding to the event (e.g. George W. Bush). And on the timeline on the upper right, the label identified the name of the Court's decision (e.g. Board of Trustees of Univ. of Alabama v. Garrett).

Text

Longer text may be associated with an event. It may be displayed in another window or a separate web browser when the event is selected.

External Links

A URL may be associated with an event. When the event is selected, a separate web browser may be directed to follow the link and display the web page at that URL.

Event Links

Events can be linked to other events. This is distinct from linking events to external links that may be followed with a web browser. There are two ways that events are linked. The first is where a single event is attached to more than one category. These instances are implicitly linked. The second is where an explicit link are defined between two events. These links refer to each event and to the file or URL where that event is defined. The links themselves do not have to be defined in any of the files where the two referenced events are defined. Selecting an event causes its links, both implicit and explicit, to be listed by the program. Choosing one of the links changes any or all of: the current time, x and y location, x/y scale, z(time) scale, and detail level to show the linked event. If the event linked is not already known in the program, the program first loads the file that contains its definition.

Sound

Sound data from a file or referenced by a URL can be attached to any state. It can be used in several modes: The sound can play continuously while the current time is between the start and end times of that state. Or, the sound can play once while current time is in that state. Or, the sound can be attached to that state in real-time mode. In this mode the sound is mapped on to the state starting at the beginning of both. In this case, the state usually has the same duration as the sound and the sound only plays when real time mode is active.

It is possible that more that one sound containing state can be current at the same time. The program computes the distance from the category containing the sound to the current x and y position at the center of the display. Only the nearest sound might be played, or the sounds might be mixed together with their volume determined by their distance, or they might be mixed together to represent the relative locations of the current sound containing states on the display. The method used is determined by user preference and by the sound support available on the user's computer.

Images

Image data stored in files or referenced by URL can be associated with events. The image can be shown only in the endcut of an event, or it can be shown at the start, end or middle of an event whenever the event is visible on the display. It is also possible to turn an image so that it always faces the camera (much like a label).

Movies/Video

A moving image can be attached to a state. The program considers a movie to be a set of images. Each image is placed at a fixed time increment from the starting time. For example if the film were shot as 16 mm, each frame would be $1/24$ of a second from the previous one. As the user moves the current time forward or back, different images appears in the endcut much like a "flip book" of images. If the current time is moved in "real-time mode" the movie would play in the endcut as a normal moving picture.

Varieties of Events

Functions

A user of the program can attach external functions to extend the functionality of the program. Functions can be written by the user or obtained from some other source. Functions can express relationships that are continuous or periodic, or where the sources for events or data is external to the files used to store data for the program (such as queries to a database, or input from a thermometer), or where the data needs to be updated as it changes in clock time (calendars of co-workers, stock prices). Functions can also be used to cause other programs or devices to be signaled when certain states change or events occur.

The phase of the moon is an example of a time function displayed as an image (FIG. 5). There is an API (application program interface) provided for the user to write her own functions.

The Doonesbury comic strip (FIG. 5) is a function that takes the current date and uses it to construct the URL of service that provides images of the comic strip on the web. The images are downloaded and displayed in the endcut.

Functions can dynamically generate events rather than relying on static stored event data. The events shown in the moon example are from a list of the fifty full and new moons closest to the current time. This list is regenerated as the current time changes.

Tables

Figure 7:
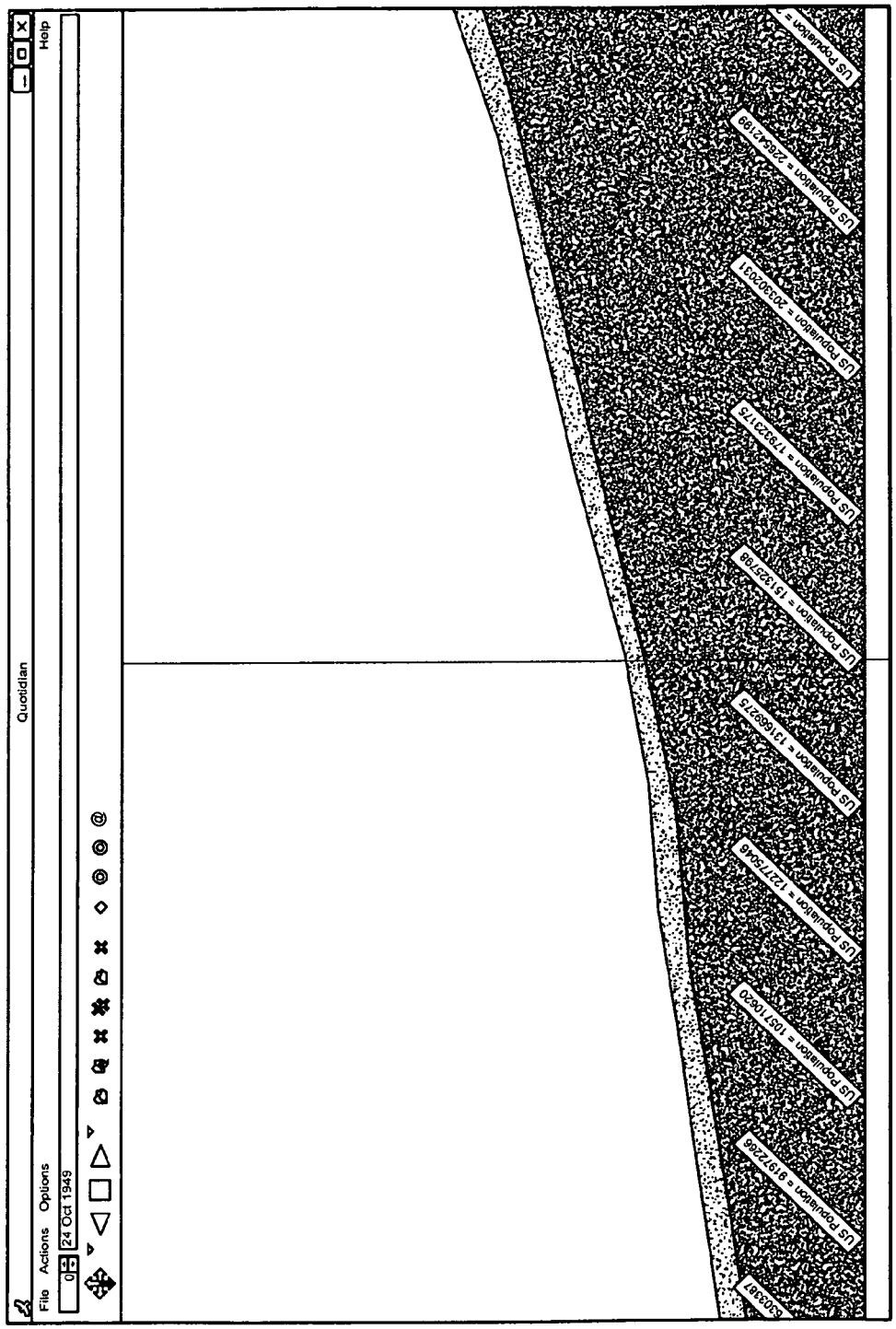
FIG. 7 illustrates an example of how the program displays a table of numerical data which in this case is the population of the U.S. from decennial census data.

Numerical data that changes over time can be entered as a table. The table contains rows which associate a time value with numerical values. The shape of the displayed events changes with the data. The height, width, or both can change. In this case, the displayed events are contained by, but do not take the shape of, a category. FIG. 7, which shows the display of a timeline from the side (e.g. looking down the x-axis), charts the change in the population of the United States from the decennial census data.

Stacks

Figure 8:
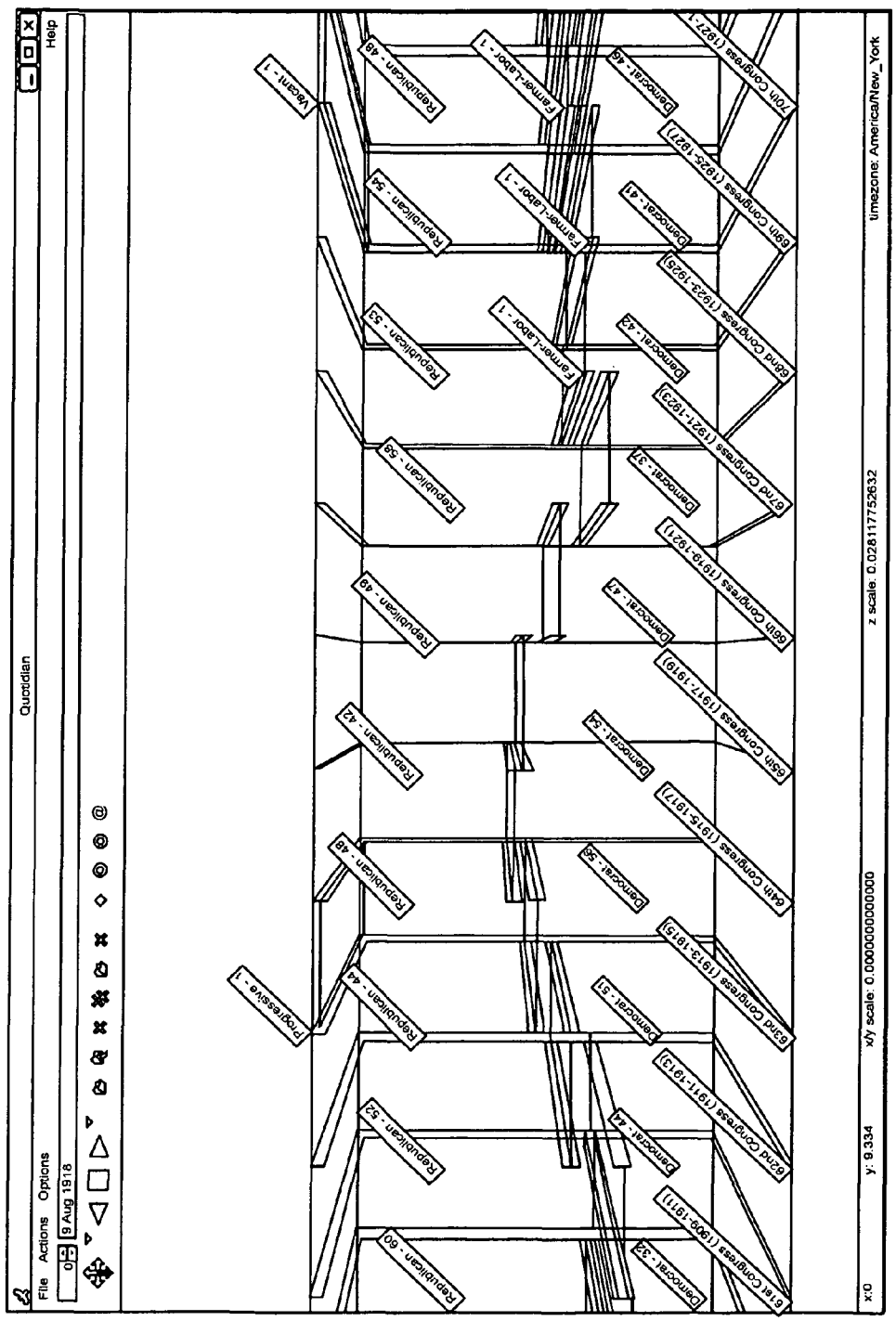
FIG. 8 illustrates an example in which the program displays in stack form the composition of the U.S. by political party.

Sometimes the whole is broken into parts whose value changes over time. A stack displays the changing relationships that make up a whole. FIG. 8, which like FIG. 7 shows the display of a timeline from the side (e.g. looking down the x-axis), shows the composition by political party of the United States Senate.

User Controls

A variety of control functions are supplied to allow a user of the program to interact with the display.

Because there are a number of axes to control and a number of kinds of actions that can be done to each axis, a game controller, like that supplied with game consoles is useful.

This hardware is not required though, and all necessary actions can be accessed with either a computer mouse, a computer keyboard, or voice recognition capability. The control functions are attached to or associated with the physical control device.

Selection

Sometimes the user of the program wants to perform an action on a single event. By selecting that event, various actions can be performed. These include: display of the text associated with the event, directing a web browser to follow the URL associated with the event, or jumping other events linked by this event. Selection may be indicated by a change in the displayed event or its label.

View Direction

The user is given the ability to change the view direction. Although in principle the view direction can be anywhere, there are four basic directions that seem to be the most useful: looking towards the future down the z axis, looking towards the past down the z axis, looking left down the x axis, and looking right down the x axis. Views down the z axis give a perspective view of time. Views down the x axis give a view that is more like a traditional timeline, with time increasing across the display. The user can modify the camera parameters for these side views to suppress the perspective projection. This causes the time increments to be consistent regardless of the distance of the categories from the camera.

Translation in X/Y

As previously mentioned, the plane formed by the x and y axis is where the categories are laid out. Moving the camera position along the x or y axis allows different categories to become visible. It also changes the perspective from which the visible timelines are seen, which can be useful when trying to get the best, most understandable view of the event information that is being displayed. There are also other effects of this movement such as changes in sound or in hiding (described below).

Translation in Z

The z axis represents time. When the view direction is down the z axis, moving the camera position along the z axis also changes the front clipping plane. The front clipping plane is associated directly with the current time of the display. When the view is to the side, down the x axis, translation in z causes events to move to the left or right on the display.

Scale in X/Y

The program usually scales the x and y axes together to keep the shapes of categories consistent. Because categories may be nested inside other categories to any practical level, increasing the scale allows previously small or invisible categories to be viewed. Decreasing the scale allows categories that were too large or too far off the edge of the screen to be visible.

Scale in Z

Figure 9:
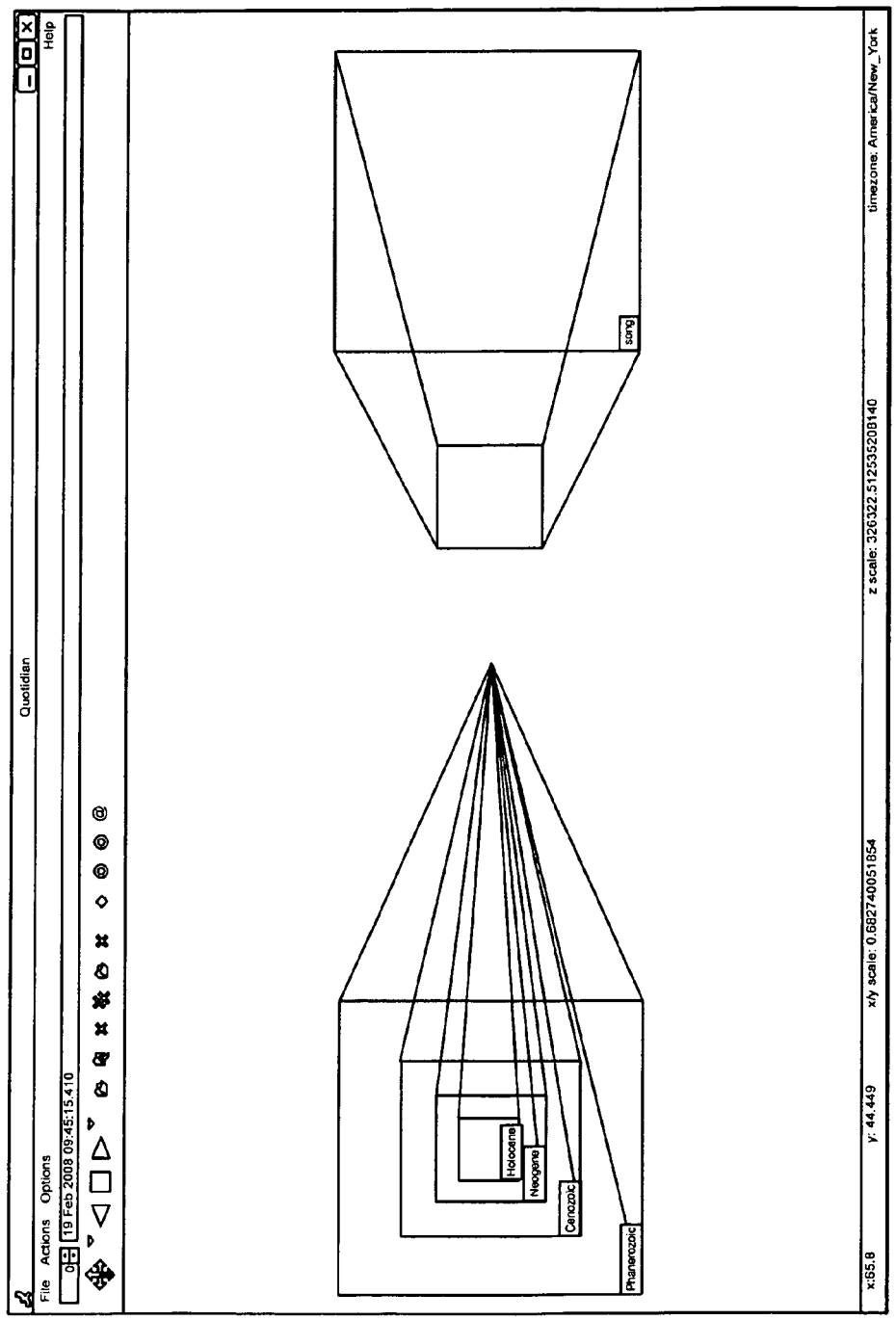
FIGS. 9 and 10 illustrate an example of how the program displays events differently depending on the time scale that the user selects.
Figure 10:
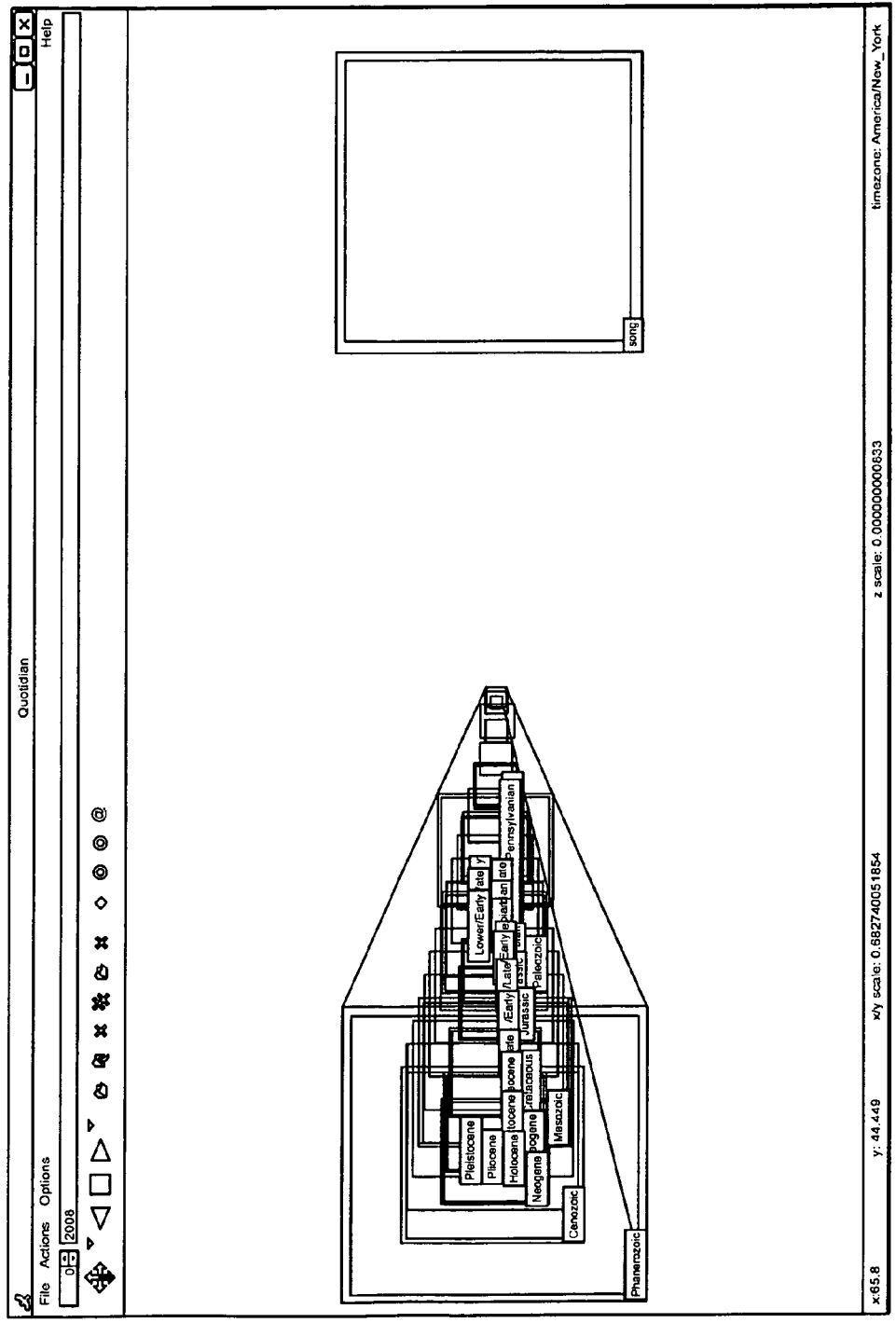

The program can be used to look at events that may take millions of years, and events that take 1/1000000000000000000 of a second. By scaling the time axis, events can be examined at the scale that makes the most sense. FIG. 9 and FIG. 10 show the effect of re-scaling two different sets of time data. On the left in both figures, the program is displaying a set of nested categories representing the eons, eras, periods, and epochs of geological time. These cover billions of years. On the right side is a state representing a song that lasts a few minutes. The current time is the same in both figures. Note that FIG. 9 shows a timescale in which the increments of time along the z-axis represent much smaller periods of time; so, the duration of the song appears to be long relative to that scale and the periods of geological lose all detail because changes occur very slowly in terms of the selected scale. In contrast, in FIG. 10 the period of time where the increments along the z-axis represent much larger periods of real time, the duration of the song appears to be zero whereas all of the details of the geological periods now become visible because they are now captured by the time scale that was selected.

Jump to Other Events

When an event is selected, the events linked to that event are displayed in a list. Selecting an event from that list causes it to become the currently selected event and the display is changed to show the event at the center of the display window. "Next" and "previous" controls are supplied to return to recently selected events. Files may be loaded if necessary.

Re-arrange Categories

The program's display can be put into a mode that allows the user to "grab" categories and to move, remove, or re-size them.

Changing the Level of Detail

There is a global "level of detail" number that can be changed by the user.

Hiding

The program can try to display a large amount of information. To stop too many categories and events from cluttering the display, there are several strategies for editing away information that may not be of immediate use to the user. All of these strategies can be modified at any time by setting appropriate display parameters.

Hiding By Event Level

Each event or state can be attached to many categories. Each time an event is attached to a category, it is given a level number representing the importance of that event in that category relative to other events in that category. These are user selectable level values. Levels are whole numbers zero or greater. Events with a level of zero are the most important and are almost always shown.

Figure 11:
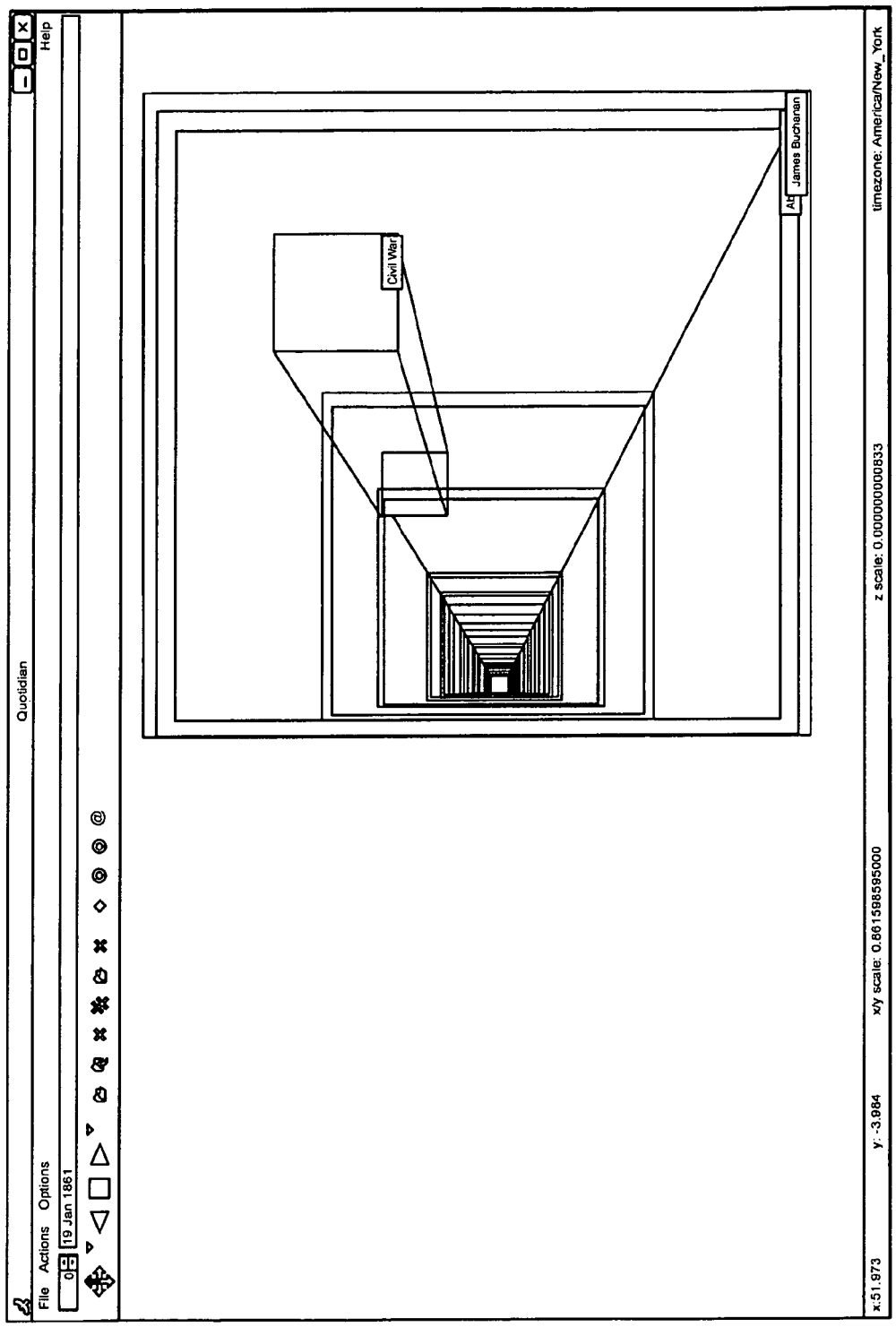
FIGS. 11 and 12 illustrate how the program uses event level the determine what events are displayed and what events are hidden.
Figure 12:
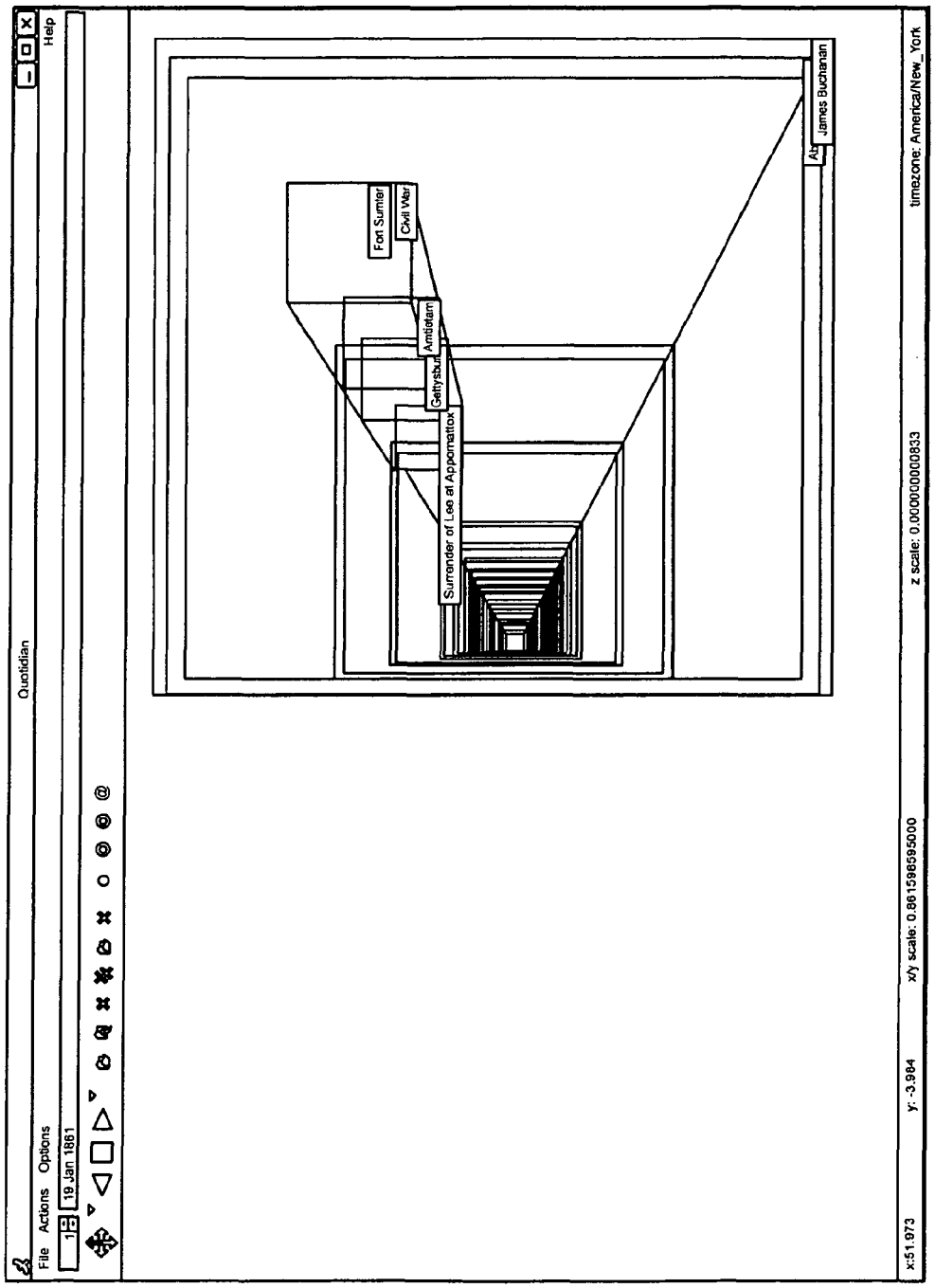

Referring to FIG. 5, there is a controller 50 on the program window that allows the user cause the program to change the level of detail. By raising the number the user can increase the number of events by showing events defined at that level or lower. FIG. 11 shows a single event to represent the entire US Civil War. In this example, the category to which the civil war event is attached is nested inside another category to which U.S. Presidents are attached. The civil war is the only event defined at level 0 for the category to which it is attached. But increasing the level of detail control to one as shown in FIG. 12 reveals four of the more important events in that war. In the described example, increasing the level of detail to 6 will cause the program to show about seventy events in that war.

One can assign a second number for events in categories. The first number was a minimum level of detail where that event was visible. The second is the maximum level of detail where that event is visible. This makes it possible to define "summary" events that stand for a set of events that only appear at higher levels of detail.

The use of level of detail is optional for the author of timelines. By leaving the minimum value at zero and the maximum at its default value, an event is never hidden by this mechanism.

Changing the level of detail in the program window is a global operation. It applies to all the categories and events loaded by the program. It is possible to define a table for each category that sets the effective level of detail when changes are made to the z (time) scale. The level of detail usually increases as the scale increases. This supplies more information as the space to display that information increases.

Other factors may be added to z scale in computing the level of detail.

Hiding With x/y Scale

As the user scales the x and y axes, certain events may become so large that their edges are beyond the edge of the screen. It may be that the user is more concerned with the categories nested inside the larger one. In this case, the program can be set to cause the larger events to gradually disappear by becoming more transparent as their size increases.

As the scale decreases, some categories may become so small that they should be hidden, along with events, labels, etc. associated with the categories. The program can be set to accomplish this.

This kind of hiding is an important aspect of the nesting of categories and makes the nesting more useful and the information more easily understandable.

Hiding With x/y Distance

In the views down the z axis, as a category is moved away from the center axis (the line from the current viewpoint to the vanishing point) it is likely that the category is providing less useful information. The program can be set to gradually hide the category as it moves farther from the center axis.

Hiding With z Distance

In a perspective view down the z axis, events in the distant past or future (relative to the current time) move to the central vanishing point and eventually become smaller than the pixel size on the screen. Events can become more transparent or not drawn at all as their distance from the current time increases. This is important in combination with the x/y distance hiding because, in the perspective view, all categories share a common vanishing point and so categories that are both far away from the central axis of the screen and far away from the current time will tend to move to the center of the screen. As these are likely to be of the little current interest to the user, their appearance should be minimized. Different aspects of the display of events may disappear at different distances. These aspects include things like labels, images, and their visible rendering itself. Parameters that control the hiding in combination with z distance are things like event level, x/y scale, and event duration.

Hiding Labels

Because they are not generally rendered in perspective, that is, their size does not change with distance, labels take up a lot of display space and their appearance should be regulated closely to avoid clutter. They may also need to be arranged when they are covered by labels of closer events. FIG. 5 shows label hiding. On the right side, many Supreme Court decisions are visible in the distance, but their labels are hidden. Only the label on the nearest one is shown. FIG. 20 shows labels being stacked vertically when the events to which they belong are at the same time A Nesting Example The Figures from FIG. 11 to FIG. 20 give an example of how the program uses the nesting of categories and various aspects of hiding. The example examines some units involved in the early and relatively minor Battle of Ball's Bluff that took place on 21 Oct. 1861 just north of Washington, D.C. Some of the events and illustrations in this example are taken from "Staff Ride Guide, Battle of Ball's Bluff" by Ted Ballard.

Referring to FIG. 11, the user has instructed the program to display the US History category which contains states for each president. There are four categories nested inside of US History: Military, Political, Social, and Cultural. None of these have any visible events. The Military category has one nested category called "Civil War" and that category has a single visible event "Civil War".

FIG. 12 shows the same view as depicted in FIG. 11. But in this case, the user has increased the manual level of detail counter in the upper left of the display from 0 to 1. This has caused the program to make visible four events arbitrarily chosen as the most important in the war. Further increases to the level of detail will cause the program to show more events.

Figure 13:
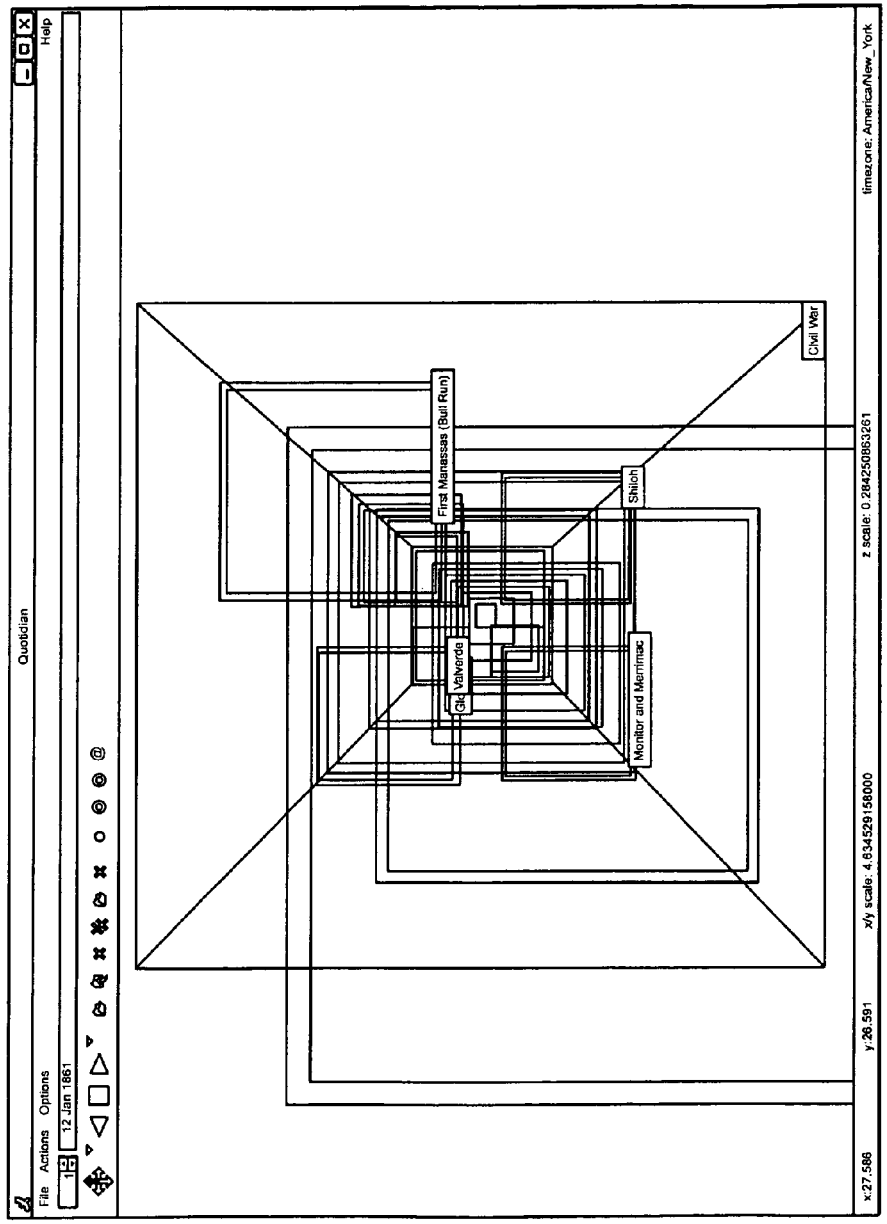
FIGS. 13-20 illustrate how the program can use nesting of categories to display different sets of events.

Referring to FIG. 13, the user has used the controls to move the Civil War category to the middle of the screen by moving the viewing location to a different point in the x-y plane and has also used those controls to increase the x/y scale. This has caused the events in the US History category to start "too big" hiding. Only a few outlines of president events are still visible (but not labeled). Inside of the Civil War category there are four nested categories representing four theaters of action: Eastern, Western, Trans-Mississippi, and Coastal. These have overcome their "too small" hiding and are now visible. We can see a few battles in each of these theaters. Note that, although all the events for these battles are attached to both the Civil War and to a theater, they are visible only in their theater categories. That is because their levels are set at one in the theater category but at higher (less important) levels in the Civil War category. For example, the Battle of Valverde has much more importance regionally in the far west than it has in the larger war. That is one reason for allowing levels to be different for the same event in different categories.

Figure 14:
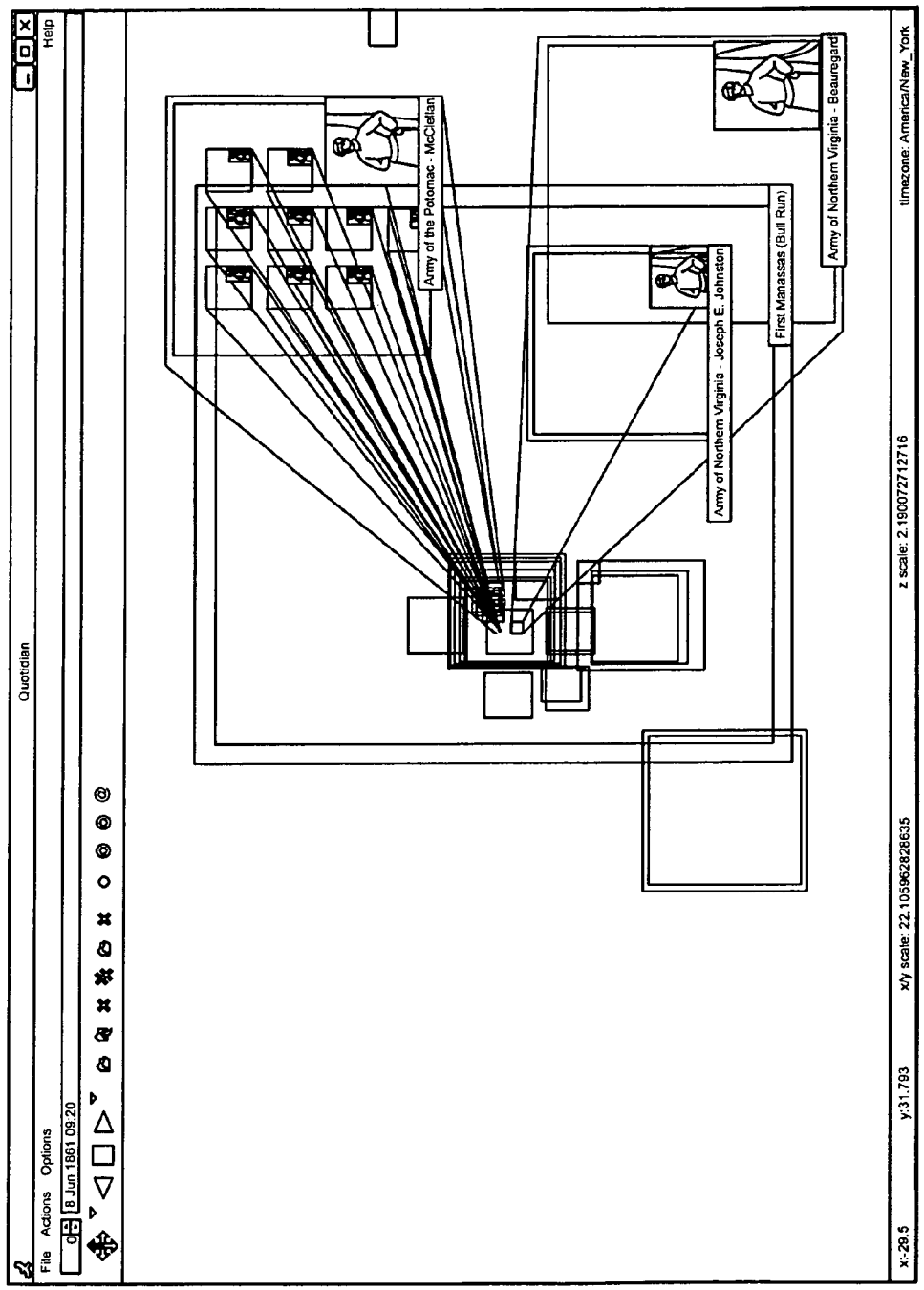

Referring to FIG. 14, increasing the scale on the Eastern theater causes the program to display categories for the two major contending armies. The events in the US History and Civil War categories have completely disappeared because they have become too big and outside the area of focus. We see the armies' leaders on 8 June and are beginning to see the divisions and their leaders in the Army of the Potomac. Note that the categories for the divisions are nested inside the category for the armies and the pictures of the leaders are displayed on the endcuts or as decorations to the events.

Figure 15:
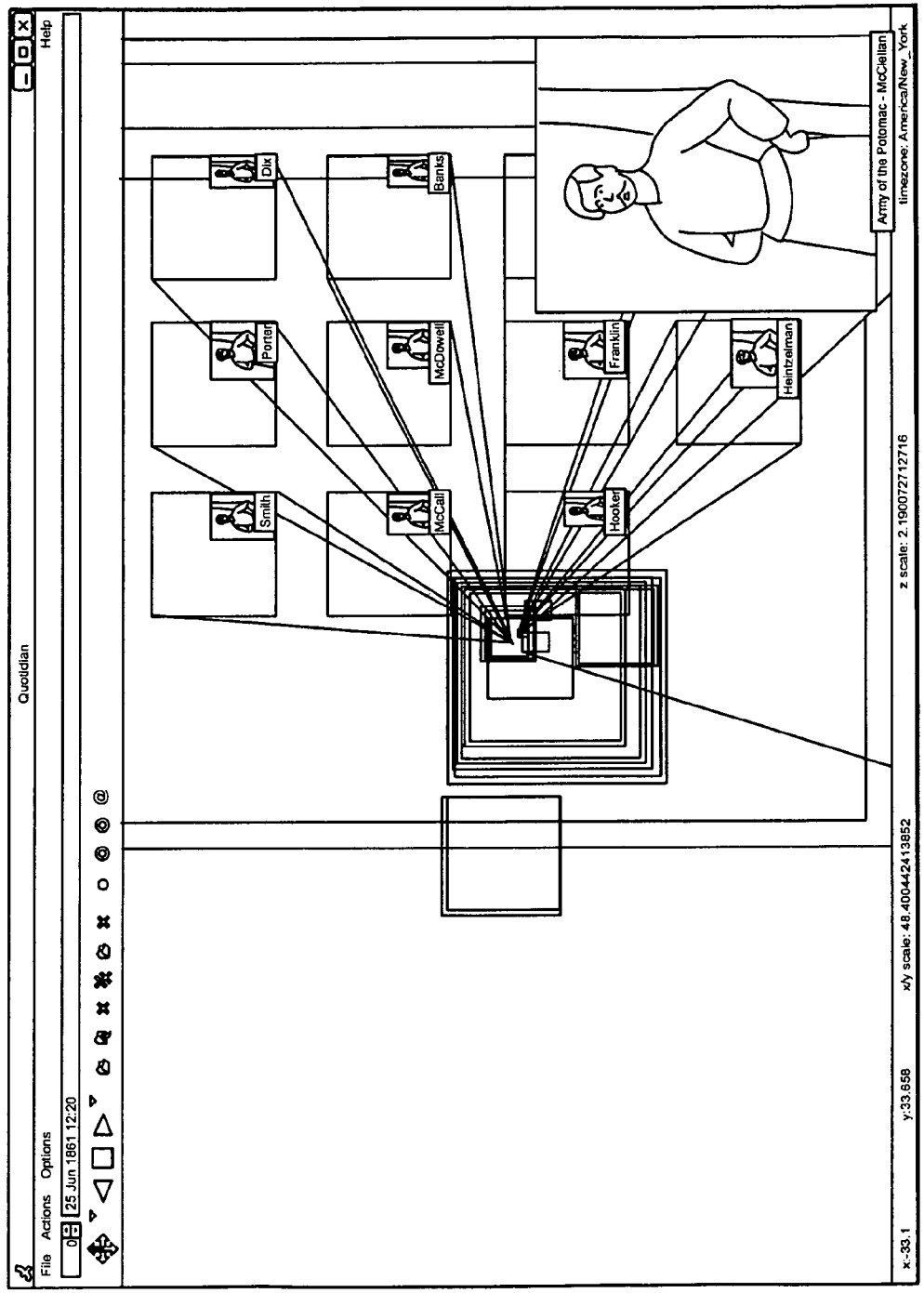
Figure 16:
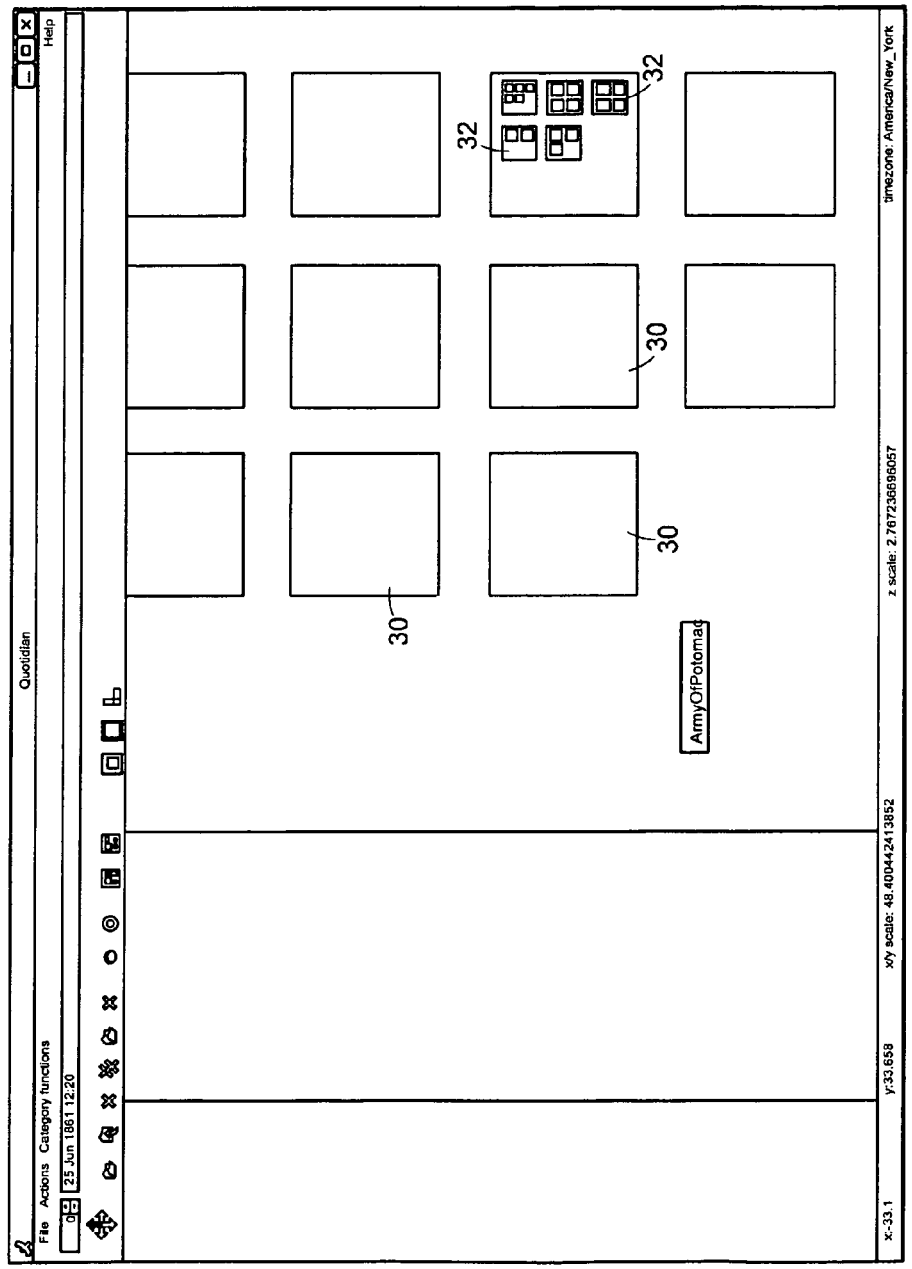

In FIG. 15, we can see that the user has moved the viewing position to the union armies and has increased the scale. This has caused the program to display most of the divisions of that Union army along with pictures their commanding generals. Two are mostly hidden behind McClellan's picture. The replacements for these generals are barely visible in the future. Note the gray square to the far left. There is a separate category in the Eastern theater category for battles between the two main armies in the east. The gray square represents the day long Battle of Ball's Bluff three months in the future. We will return to this category later.

FIG. 16 shows the x/y or category editor interface. This shows the nesting present in that part of the front clipping plane shown from the same position as FIG. 15. There are five levels visible (Eastern theater, Army of the Potomac, divisions, brigades, regiments), three are already too large to be visible (US History, Military, Civil War). It also shows that this is only an example: only General Stone's division is populated with brigades and regiments. We could use the editor to move and re-scale categories, but we leave them untouched and return to the main window.

Figure 17:
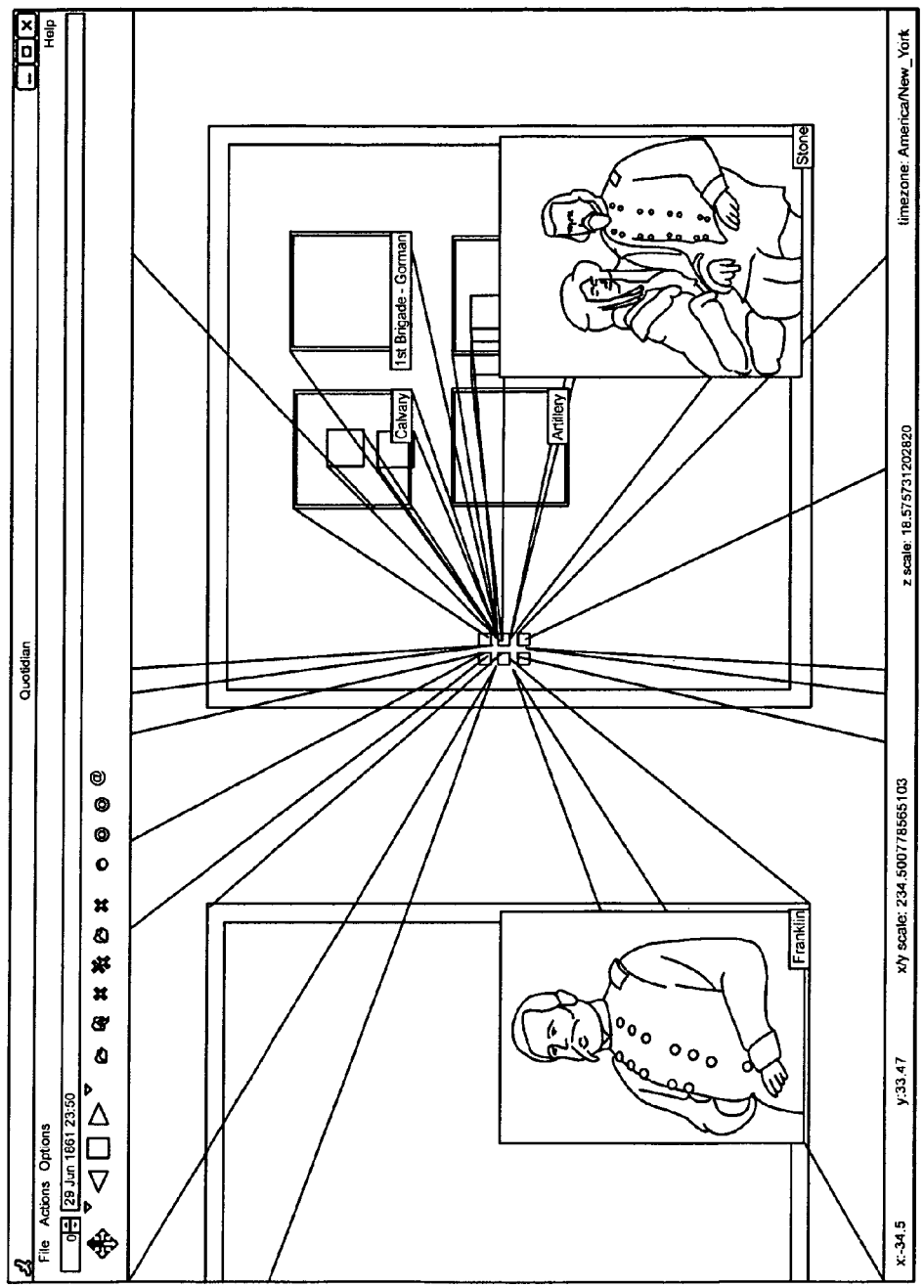

As shown in FIG. 17, the user has caused the program to expand General Stone's division which was hidden behind McClellan's picture in FIG. 15.

Figure 18:
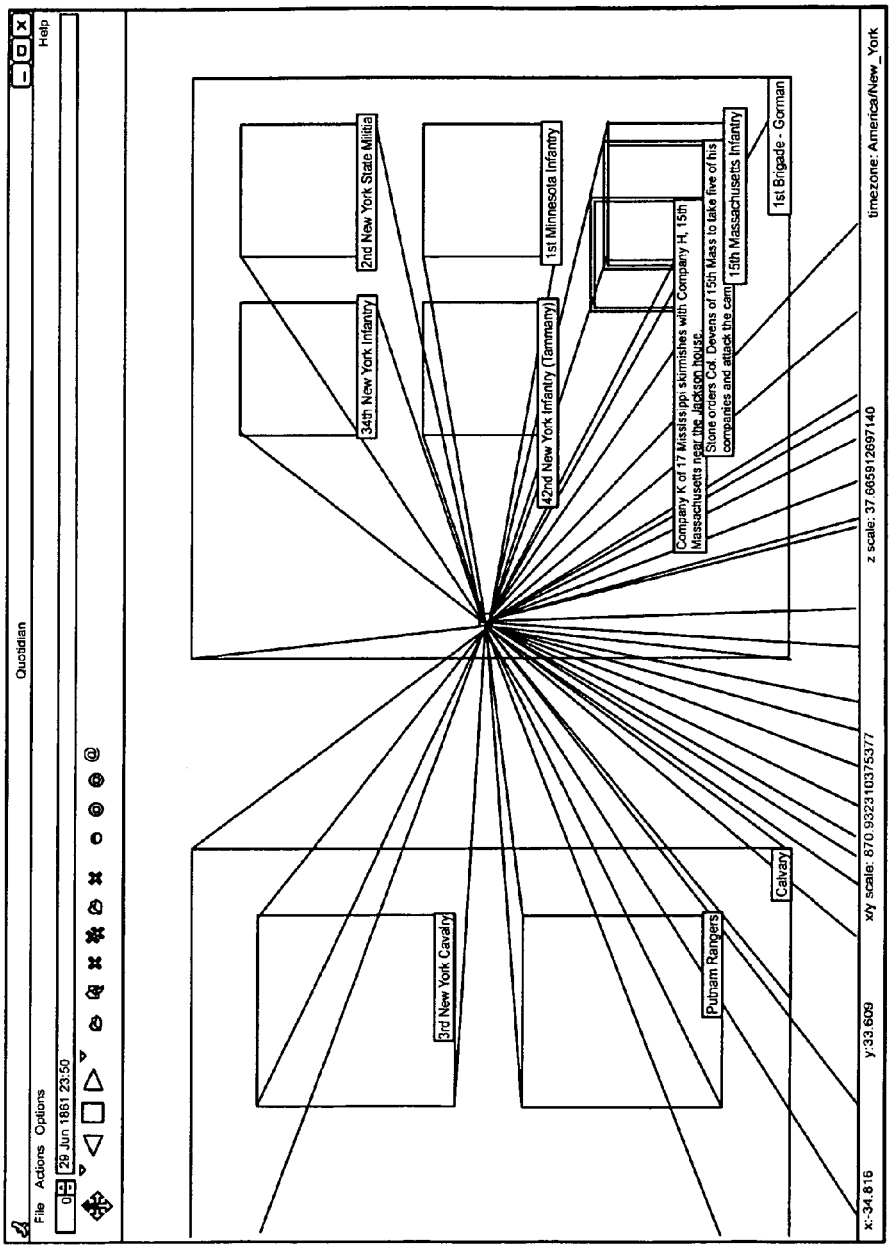

In FIG. 18, the user has expand General Gonnan's brigade and moved forward to late on October 20, as the battle is starting. We can see a few of the more important events attached to the 15$^{th}$ Massachusetts Regiment.

Figure 19:
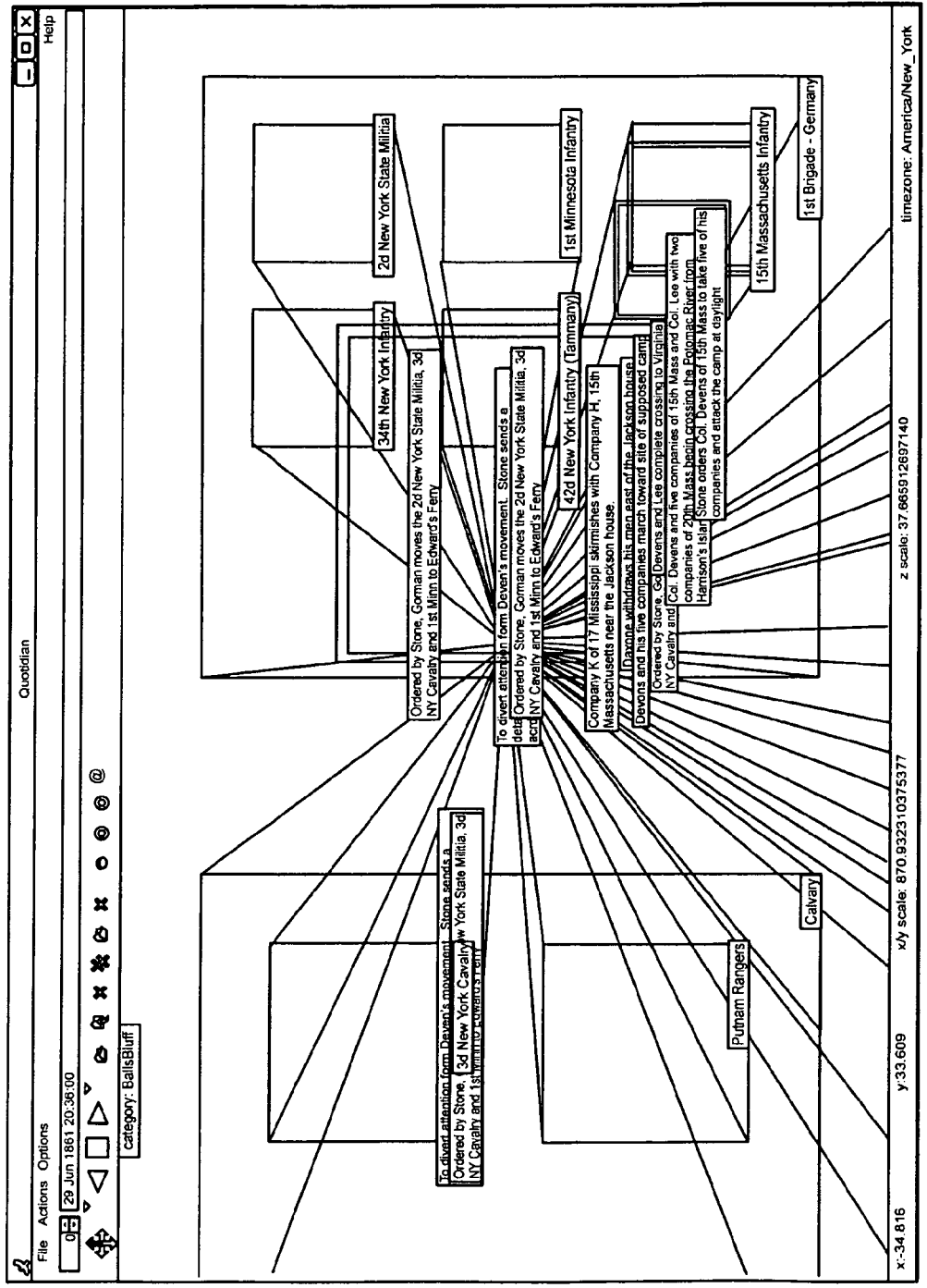
Figure 20:
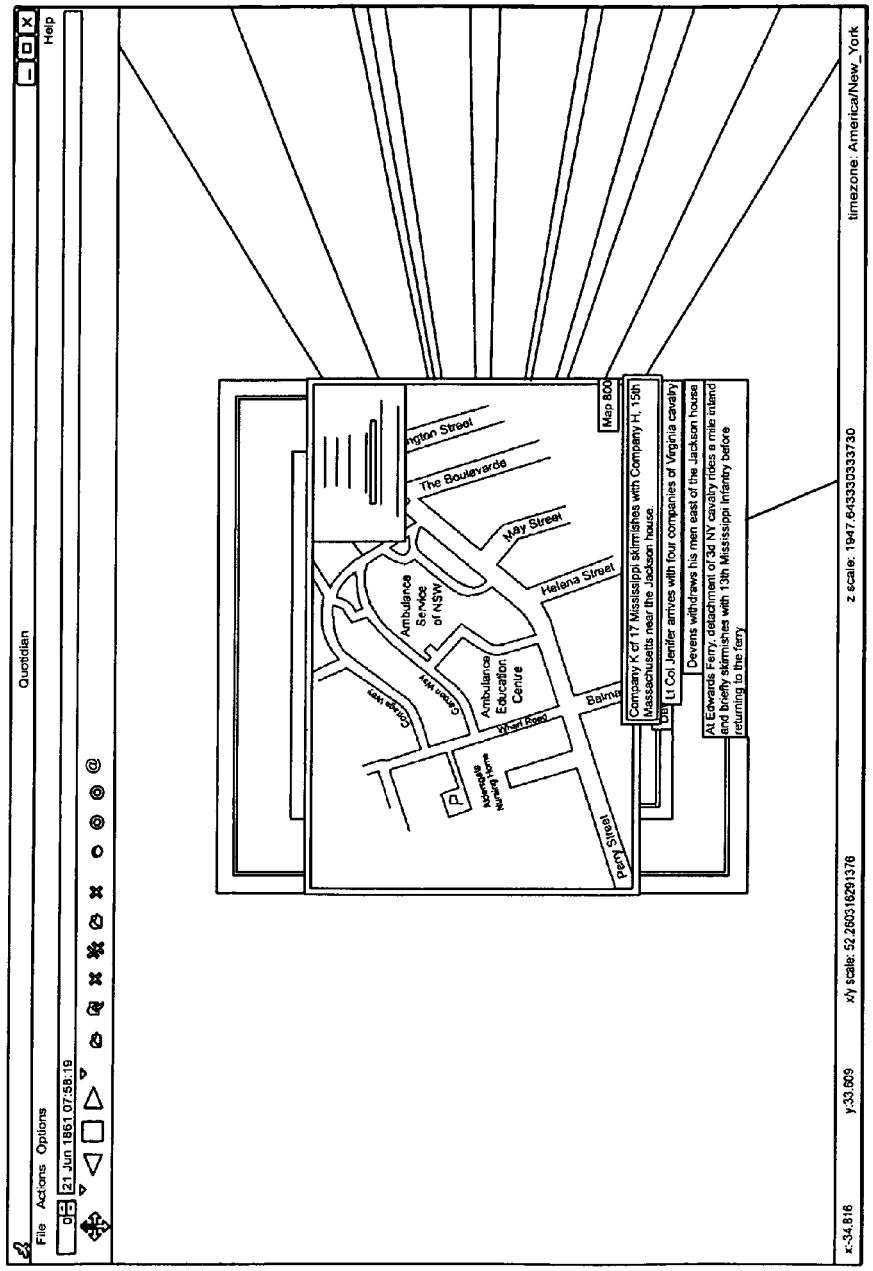

In FIG. 19, the user increased the z (or time) scale from about 37 to about 201. These categories have scale/level lists that automatically cause the program to show more events without the user having to manually change the global level of detail counter near the upper left corner of the window. All these battle events are created in the main Ball's Bluff timeline and attached to categories of the units to which the events refer. By selecting one of the events, the skirmish between the 17$^{th}$ Mississippi and the 15$^{th}$ Massachusetts, the label for that event is surrounded by a color border (seen in the figure as a darker boarder) and the square box in the toolbar becomes active. Clicking on that box causes the program to display a list of all the links from that event. The user can select the one category in the list.

FIG. 20 shows how the program has changed the display by following the link to the event in the Ball's Bluff category. Note that the battle has changed from a single gray square in FIG. 15 into many visible events that include maps every few hours and images of the battle and its participants.

There are four other events attached to the category with the same time. One of them has a map attached as an image. The labels are stacked vertically to make them visible.

Data Storage

The event data that this program uses can be stored in files on the local computer, in a local or remote database system, or in some other manner that allows the program to receive data in an expected format.

It is possible for the program to receive information about changing events as they occur and to display those events. The program may actively inquire about changes in external data sources, or the program may wait to be notified that a change has occurred.

Landmarks/Bookmarks

Figure 21:
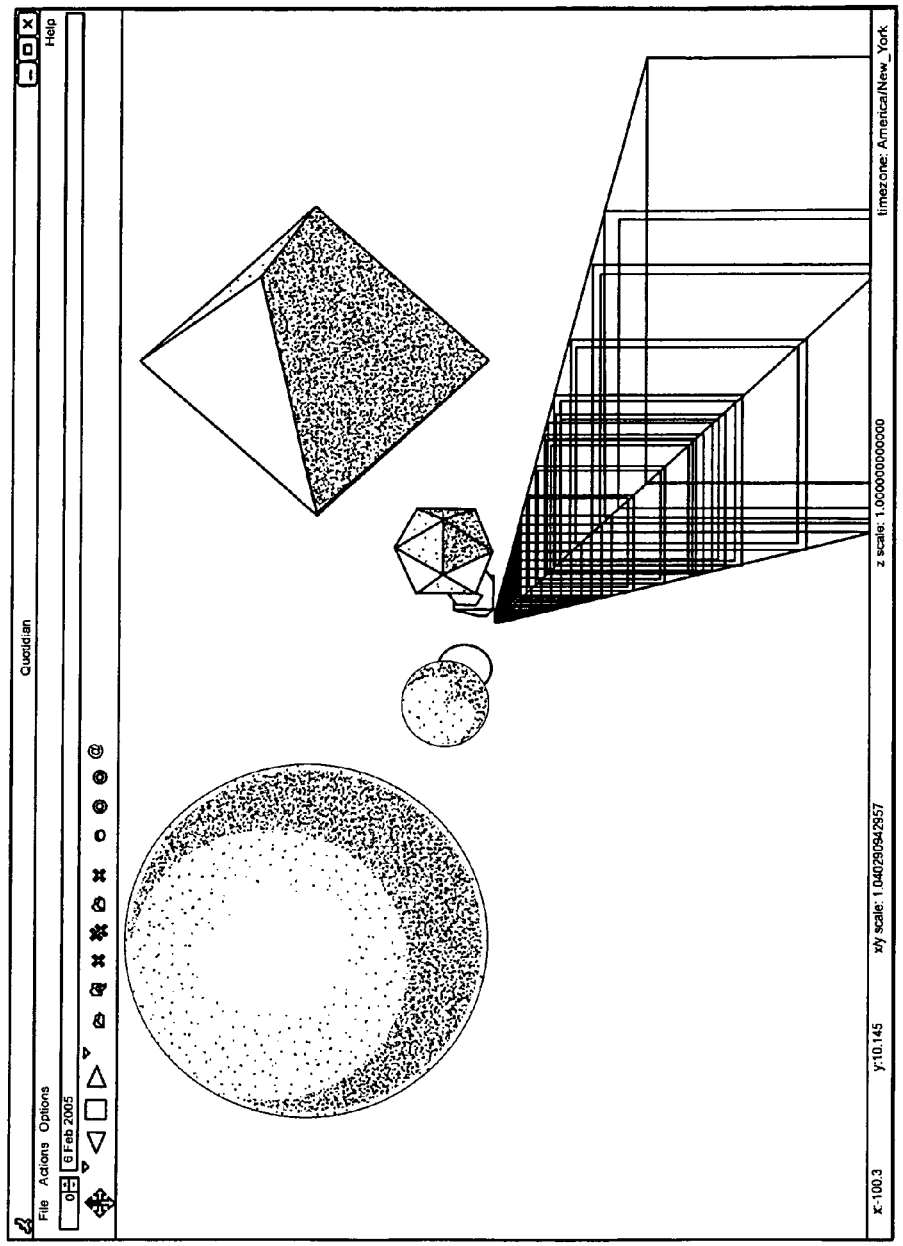
FIG. 21 shows the display of other objects as time based events.

As shown in FIG. 21, it is possible to cause the program to display other 3-D objects as time based events. These other objects might be strictly decorative, or they might be used to provide context or act as landmarks when navigating the 3-D space. It is only necessary that the z position for the object be specified as time values.

Browser Linking

A web page can contain a link to a file or other source of time data. By selecting the link, the browser or operating system can direct the program to show the data referred to by the link on the program's display.

Computer System

It should be understood that throughout the description, discussions utilizing terms such as "processing" or "computing" or "calculating" or "determining" or "displaying" or the like, refer to the actions and processes of a computer system, or similar electronic computing device, that manipulates and/or transforms data represented as physical (electronic) quantities within the computer system's registers and memories into other data similarly represented as physical quantities within the computer system memories or registers or other such information storage, transmission, or display devices. Similarly, the descriptions of algorithms and programs also refer to the actions and processes of such a computer system or similar electronic computing device.

Figure 22:
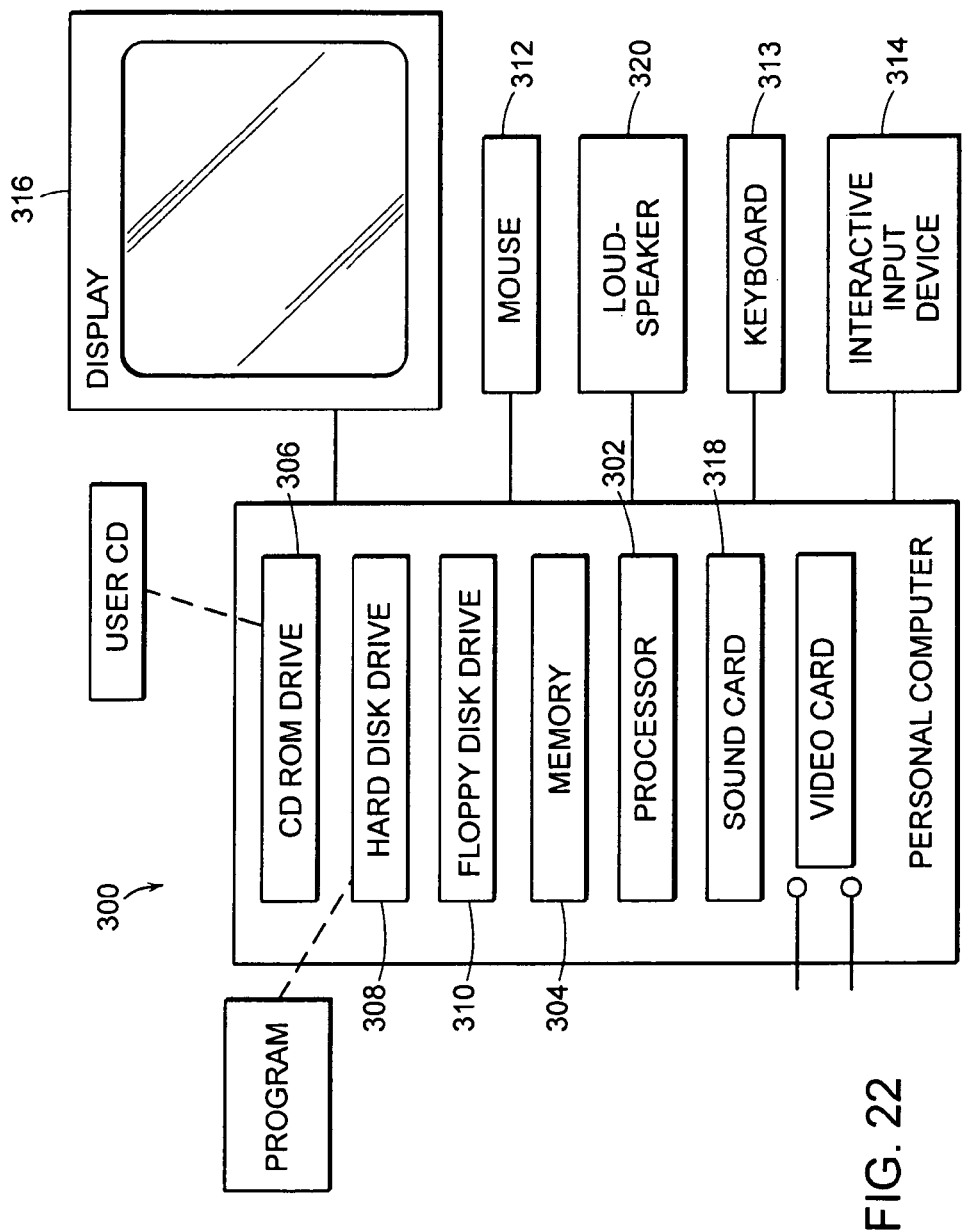
FIG. 22 shows a computer system on which the program described herein can be run.

Referring to FIG. 22, a representative computer system 300 or electronic computing device that can carry out or execute these actions and processes includes: one or more processors 300; associated memory systems 304 (e.g. RAM and ROM); data and program storage devices, such as a CD ROM drive 306, a hard drive 308, and a floppy drive 310; input devices, such as a mouse 312, a keyboard, 313, and a game controller 314; and output devices, such as a displays 316, printers, and sound cards 318 with connected speakers 320 for outputting images and/or sound.

Also, it should be understood that the algorithms and programs described herein are typically stored on computer readable medium, e.g. disks, CDs 322, hard drives, RAM, ROM, etc. for execution by the computer systems and/or electronic computing devices mentioned above.

Other embodiments are within the following claims.

What is claimed is:

1. A computer-implemented method of displaying information about a first plurality of time-based events, each of which has an associated time, and a second plurality of time-based events, each of which has an associated time, said method comprising:

simultaneously displaying perspective representations of each of a plurality of timelines including a first timeline and a second timeline, wherein displaying the perspective representation of the first timeline comprises simultaneously displaying perspective images of representations of multiple events of the first plurality of events arrayed along the first timeline at locations in time corresponding to the times associated with those multiple events and wherein displaying the perspective representation of the second timeline comprises simultaneously displaying perspective images of representations of multiple events of the second plurality of events arrayed along the second timeline at locations in time corresponding to the times associated with those multiple events;

enabling a user to select a current time; and in response to the user selecting the current time, simultaneously displaying perspective representations of a portion of each of the first and second timelines as determined by the user selected current time.

2. The computer-implemented method of claim 1, wherein displaying perspective representations of a portion of each of the first and second timelines comprises identifying an event among the first plurality of events that corresponds to the current time and displaying an image of the representation of that corresponding event as a front event on the first timeline.

3. The computer-implemented method of claim 2, wherein displaying perspective representations of a portion of each of the first and second timelines comprises identifying a corresponding event among the second plurality of events and displaying an image of the representation of that corresponding event among the second plurality of events as a front event on the second timeline.

4. The computer-implemented method of claim 1, wherein each event of the first plurality of events has an associated time range and wherein the identified corresponding event is identified by finding an event among the plurality of first events for which the associated time range includes the current time.

5. The computer-implemented method of claim 1, wherein displaying perspective representations of said portion of each of the first and second timelines comprises identifying all events among the first plurality of events for which their respective time ranges include the current time and displaying images of the representations of said all events as front events on the first timeline.

6. The computer-implemented method of claim 1, wherein the representations of the events are three dimensional objects each of which has a time dimension and two spatial dimensions.

7. The computer-implemented method of claim 1, wherein the images of the representations of the events are projections of the three dimensional objects representing the events.

8. The computer-implemented method of claim 1, wherein displaying the representation of the corresponding event as a front event on the first timeline also involves not displaying representations of any of the events in the first timeline that are after the front event.

9. The computer-implemented method of claim 1, wherein displaying a perspective representation of each of a plurality of timelines involves displaying the second timeline within the first timeline.

10. The computer-implemented method of claim 1, wherein displaying a perspective representation of a plurality of timelines involves displaying the first and second timelines next to each other.

11. The computer-implemented method of claim 1, further comprising assigning each timeline of the plurality of timelines with an associated different region of an x-y space and using the associated regions to determine where the perspective representations of the timelines are displayed on a visual display device.

12. The computer-implemented method of claim 1, wherein the associated region for the second timeline is within the associated region for the first timeline.

13. The computer-implemented method of claim 1, further comprising enabling the user to select a location within the x-y space to thereby determine which of the plurality of timelines is displayed to the user.

14. The computer-implemented method of claim 1, further comprising enabling the user to select a scale for the x-y space and thereby determine what timelines located around said location in x-y space are displayed.

15. The computer-implemented method of claim 1, further comprising assigning a corresponding level to each of the events among the first plurality of events and using the levels that are assigned to the events among the first plurality of events to determine which events among the first plurality of events are displayed and which events among the first plurality of events are not displayed along the perspective representation of the first timeline.

16. The computer-implemented method of claim 1, further comprising storing time-based information for each event of the first plurality of events.

17. The computer-implemented method of claim 2, further comprising associating other information with each of the events of the first plurality of events and wherein displaying the image of the representation of the front event of the first plurality of events also involves displaying at least some of the other information associated with that front event.

18. The computer-implemented method of claim 1, further comprising associating other information with each of the events of the first plurality of events and further comprising displaying at least some of the other information along with the perspective images of the representations of at least some of the events among the first plurality of events.

19. The computer-implemented method of claim 18, wherein for each event of the first plurality of events the other information includes a label associated with that event and wherein displaying at least some of the other information along with the perspective images of the representations of at least some of the events among the first plurality of events comprises displaying the labels.

20. The computer-implemented method of claim 18, wherein for each event of the first plurality of events the other information includes text associated with that event and wherein displaying at least some of the other information along with the perspective images of the representations of at least some of the events among the first plurality of events comprises displaying the text.

21. The computer-implemented method of claim 18, wherein for each event of the first plurality of events the other information includes an image associated with that event and wherein displaying at least some of the other information along with the perspective images of the representations of at least some of the events among the first plurality of events comprises displaying the images.

22. Computer readable non-transitory medium storing code for causing a computer to display information about a first plurality of time-based events, each of which has an associated time, and a second plurality of time-based events, each of which has an associated time, wherein the stored code when executed on the computer causes the computer to:
simultaneously display perspective representations of each of a plurality of timelines including a first timeline and a second timeline, wherein displaying the perspective representation of the first timeline comprises simultaneously displaying perspective images of representations of multiple events of the first plurality of events arrayed along the first timeline at locations in time corresponding to the times associated with those multiple events and wherein displaying the perspective representation of the second timeline comprises simultaneously displaying perspective images of representations of multiple events of the second plurality of events arrayed along the second timeline at locations in time corresponding to the times associated with those multiple events;
enable a user to select a current time; and
in response to the user selecting the current time, simultaneously display perspective representations of a portion of each of the first and second timelines as determined by the user selected current time.

23. The computer readable medium of claim 22, wherein the stored code causes the computer to display perspective representations of a portion of each of the first and second timelines by identifying an event among the first plurality of events that corresponds to the current time and display an image of the representation of that corresponding event as a front event on the first timeline.

24. The computer readable medium of claim 23, wherein each event of the first plurality of events has an associated time range and wherein the stored code causes the computer to identify the corresponding event by finding an event among the plurality of first events for which the associated time range includes the current time.

25. The computer readable medium of claim 22, wherein the stored code causes the computer to display perspective representations of said portion of each of the first and second timelines by identifying all events among the first plurality of events for which their respective time ranges include the current time and display images of the representations of said all events as front events on the first timeline.

26. The computer readable medium of claim 22, wherein the representations of the events are three dimensional objects each of which has a time dimension and two spatial dimensions.

27. The computer readable medium of claim 22, wherein the images of the representations of the events are projections of the three dimensional objects representing the events.

28. The computer readable medium of claim 22, wherein the stored code causes the computer to not display representations of any of the events in the first timeline that are after the front event.

29. The computer readable medium of claim 22, wherein the stored code causes the computer to display a perspective representation of each of a plurality of timelines by displaying the second timeline within the first timeline.

30. The computer readable medium of claim 22, wherein the stored code causes the computer to display a perspective representation of each of a plurality of timelines by displaying the first and second timelines next to each other.

31. The computer readable medium of claim 22, wherein the stored code further causes the computer to assign each timeline of the plurality of timelines with an associated different region of an x-y space and use the associated regions to determine where the perspective representations of the timelines are displayed on a visual display device.

32. The computer readable medium of claim 22, wherein the associated region for the second timeline is within the associated region for the first timeline.

33. The computer readable medium of claim 22, wherein the stored code further causes the computer to enable the user to select a location within the x-y space to thereby determine which of the plurality of timelines is displayed to the user.

34. The computer readable medium of claim 22, wherein the stored code further causes the computer to enable the user to select a scale for the x-y space and thereby determine what timelines located around said location in x-y space are displayed.

35. The computer readable medium of claim 22, wherein the stored code further causes the computer to assign a corresponding level to each of the events among the first plurality of events and use the levels that are assigned to the events among the first plurality of events to determine which events among the first plurality of events are displayed and which events among the first plurality of events are not displayed along the perspective representation of the first timeline.

36. The computer readable medium of claim 22, wherein the stored code further causes the computer to associate other information with each of the events of the first plurality of events and display at least some of the other information along with the perspective images of the representations of at least some of the events among the first plurality of events.

37. The computer readable medium of claim 36, wherein for each event of the first plurality of events the other information includes a label associated with that event and wherein the stored code further causes the computer to display at least some of the other information along with the perspective images of the representations of at least some of the events among the first plurality of events comprises displaying the labels.

\* \* \* \* \*